US010766024B2

(12) United States Patent
Halas et al.

(10) Patent No.: US 10,766,024 B2
(45) Date of Patent: Sep. 8, 2020

(54) MULTICOMPONENT PLASMONIC PHOTOCATALYSTS CONSISTING OF A PLASMONIC ANTENNA AND A REACTIVE CATALYTIC SURFACE: THE ANTENNA-REACTOR EFFECT

(71) Applicant: William Marsh Rice University, Houston, TX (US)

(72) Inventors: Nancy Jean Halas, Houston, TX (US); Peter Nordlander, Houston, TX (US); Hossein Robatjazi, Houston, TX (US); Dayne Francis Swearer, Houston, TX (US); Chao Zhang, Houston, TX (US); Hangqi Zhao, Houston, TX (US); Linan Zhou, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 15/977,843

(22) Filed: May 11, 2018

(65) Prior Publication Data
US 2018/0333712 A1    Nov. 22, 2018

Related U.S. Application Data

(60) Provisional application No. 62/505,496, filed on May 12, 2017.

(51) Int. Cl.
*B01J 35/00* (2006.01)
*B01J 35/10* (2006.01)
(Continued)

(52) U.S. Cl.
CPC ........... *B01J 35/004* (2013.01); *B01J 19/123* (2013.01); *B01J 19/127* (2013.01); *B01J 21/04* (2013.01); *B01J 23/002* (2013.01); *B01J 23/38* (2013.01); *B01J 23/44* (2013.01); *B01J 23/50* (2013.01); *B01J 23/52* (2013.01); *B01J 23/58* (2013.01);
(Continued)

(58) Field of Classification Search
CPC ...................................................... B01J 35/004
See application file for complete search history.

(56) References Cited

U.S. PATENT DOCUMENTS

2016/0193595 A1\*    7/2016    Nagpal ..................... C25B 3/04
                                                                                  502/215

FOREIGN PATENT DOCUMENTS

KR          101712373  B1        3/2017
KR          101725059  B1        4/2017
WO       WO2015/002944    \*    1/2015

OTHER PUBLICATIONS

International Search Report issued in corresponding International Application No. PCT/US2018/032375 dated Apr. 11, 2019 (3 pages).
(Continued)

*Primary Examiner* — Douglas B Call
(74) *Attorney, Agent, or Firm* — Osha Liang LLP

(57) ABSTRACT

A multicomponent photocatalyst includes a reactive component optically, electronically, or thermally coupled to a plasmonic material. A method of performing a catalytic reaction includes loading a multicomponent photocatalyst including a reactive component optically, electronically, or thermally coupled to a plasmonic material into a reaction chamber, introducing molecular reactants into the reaction chamber, and illuminating the reaction chamber with a light source.

18 Claims, 21 Drawing Sheets

(51) Int. Cl.
  B01J 37/02 (2006.01)
  B01J 21/04 (2006.01)
  B01J 23/89 (2006.01)
  B01J 23/50 (2006.01)
  B01J 23/52 (2006.01)
  B01J 27/24 (2006.01)
  B01J 31/06 (2006.01)
  B01J 19/12 (2006.01)
  B01J 31/16 (2006.01)
  B01J 23/38 (2006.01)
  B01J 27/20 (2006.01)
  B01J 27/04 (2006.01)
  B01J 23/78 (2006.01)
  B01J 37/34 (2006.01)
  B01J 27/14 (2006.01)
  B01J 37/03 (2006.01)
  B01J 23/00 (2006.01)
  B01J 27/22 (2006.01)
  B01J 23/72 (2006.01)
  B01J 23/44 (2006.01)
  B01J 23/58 (2006.01)
(52) U.S. Cl.
  CPC ............. *B01J 23/72* (2013.01); *B01J 23/78* (2013.01); *B01J 23/8926* (2013.01); *B01J 23/8946* (2013.01); *B01J 27/04* (2013.01); *B01J 27/14* (2013.01); *B01J 27/20* (2013.01); *B01J 27/22* (2013.01); *B01J 27/24* (2013.01); *B01J 31/06* (2013.01); *B01J 35/002* (2013.01); *B01J 35/0006* (2013.01); *B01J 35/006* (2013.01); *B01J 35/008* (2013.01); *B01J 35/0013* (2013.01); *B01J 35/0033* (2013.01); *B01J 35/1066* (2013.01); *B01J 37/0203* (2013.01); *B01J 37/0225* (2013.01); *B01J 37/03* (2013.01); *B01J 37/344* (2013.01); *B01J 31/1691* (2013.01); *B01J 2219/00635* (2013.01); *B01J 2523/00* (2013.01); *B01J 2540/66* (2013.01)

(56) References Cited

OTHER PUBLICATIONS

Written Opinion issued in corresponding International Application No. PCT/US2018/032375 dated Apr. 11, 2019 (5 pages).
Swearer, Dayne F. et al., "Heterometallic antenna reactor complexes for photocatalysis", PNAS, 2016, vol. 113, pp. 8916-8920 (5 pages).
Xiao, Qi et al., "Visible Light-Driven Cross-Coupling Reactions at Lower Temperatures Using a Photocatalyst of Palladium and Gold Alloy Nanoparticles", ACS Catal, 2014, vol. 4, pp. 1725-1734 (10 pages).
Shou, Qingliang et al., "Synthesis and characterization of a nanocomposite of goethite nanorods and reduced graphene oxide for electrochemical capacitors", Journal of Solid State Chemistry, 2012, vol. 185, pp. 191-197 (7 pages).
International Preliminary Report on Patentability issued in corresponding Application No. PCT/US2018/032375, dated Nov. 21, 2019 (7 pages).

\* cited by examiner

| Wavelength (nm) | Intensity (W/cm²) | | | | |
|---|---|---|---|---|---|
| | 0.8 | 1.6 | 2.4 | 3.2 | 4 |
| 450 | 0.99 | 0.83 | 0.73 | 0.62 | 0.48 |
| 475 | 0.94 | 0.82 | 0.62 | 0.52 | 0.42 |
| 500 | 0.88 | 0.81 | 0.57 | 0.47 | 0.39 |
| 525 | 0.84 | 0.75 | 0.54 | 0.43 | 0.35 |
| 550 | 0.78 | 0.68 | 0.47 | 0.35 | 0.27 |
| 575 | 0.88 | 0.81 | 0.68 | 0.52 | 0.46 |
| 600 | 1.10 | 0.97 | 0.83 | 0.53 | 0.48 |
| 650 | 1.13 | 1.00 | 0.84 | 0.78 | 0.66 |
| 700 | 1.15 | 1.02 | 0.92 | 0.87 | 0.79 |

| Sample | Metal element concentration (mmol/g precursor) | |
| --- | --- | --- |
| | Cu | Ru |
| Cu-Ru | 1.79 | 0.0565 |
| Cu | 1.94 | N/A |
| Ru | N/A | 0.0538 |

MULTICOMPONENT PLASMONIC PHOTOCATALYSTS CONSISTING OF A PLASMONIC ANTENNA AND A REACTIVE CATALYTIC SURFACE: THE ANTENNA-REACTOR EFFECT

STATEMENT REGARDING FEDERALLY SPONSORED RESEARCH OR DEVELOPMENT

The invention was made with government support under Grant No. FA9550-15-1-0022, awarded by the Air Force Office of Scientific Research and Grant No. DGE1450681, awarded by the National Science Foundation. The government has certain rights in the invention.

BACKGROUND

Industrial processes depend extensively on heterogeneous catalysts for chemical production and mitigation of environmental pollutants. These processes often rely on metal nanoparticles dispersed onto high surface area support materials to both maximize catalytically active surface area and for the most cost-effective use of expensive catalysts such as palladium, platinum, ruthenium, or rhodium. However, catalytic processes utilizing transition metal nanoparticles are often energy intensive, relying on high temperatures and pressures to maximize catalytic activity.

Light-driven chemical transformations may offer an attractive and ultimately sustainable alternative to traditional high-temperature catalytic reactions. Metallic plasmonic nanostructures may be useful for photoactive heterogeneous catalysts. Plasmonic nanoparticles uniquely couple electron density with electromagnetic radiation, leading to a collective oscillation of the conduction electrons in resonance with the frequency of incident light, known as a localized surface plasmon resonance (LSPR). These resonances lead to enhanced light absorption in an area much larger than the physical cross-section of the nanoparticle, and such optical antenna effects result in strongly enhanced electromagnetic fields near the nanoparticle surface. An LSPR can be damped through radiative reemission of a photon, or non-radiative Landau damping with the creation of energetic "hot" carriers: electrons above the Fermi energy of the metal and/or holes below the Fermi energy.

In this context, "hot" refers to carriers of an energy that is a significant fraction of the plasmon energy that would not be generated thermally at ambient temperature. Plasmonic metal nanoparticles have been shown to induce chemical transformations directly on their surfaces, through either phonon-driven or charge-carrier-driven mechanisms in Au, Ag, Cu, and, recently, Al nanoparticles. Although these "good" plasmonic metals may show initial promise for plasmon-induced photocatalytic chemistry, in general they have been shown to not be universally good catalytic materials.

In comparison, non-coinage transition metals have historical precedence as excellent catalysts, yet are generally considered poor plasmonic metals, because they suffer from large non-radiative damping, which results in broad spectral features and weak absorption across the visible region of the spectrum. Many catalytic transition metal nanoparticles (Pt, Pd, Rh, Ru, etc.) possess LSPRs in the UV, but this is disadvantageous for photocatalysis because of poor overlap with conventional laser sources or, alternatively, with the solar spectrum. One option to increase transition metal nanoparticles absorption properties is to increase the transition metal nanoparticle size, which would redshift the optical absorption, but it also increases cost and reduces surface area, and therefore catalytic activity.

This invention was made with support from the following Welch Foundation Grants: C-1220 and C-1222.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a multicomponent photocatalyst that includes a reactive component optically, electronically, or thermally coupled to a plasmonic material.

In another aspect, embodiments disclosed herein relate to a method of performing a catalytic reaction that includes loading a multicomponent photocatalyst including a reactive component optically, electronically, or thermally coupled to a plasmonic material into a reaction chamber, introducing molecular reactants into the reaction chamber; and illuminating the reaction chamber with a light source.

Other aspects and advantages of the claimed subject matter will be apparent from the following description and the appended claims.

DETAILED DESCRIPTION

Figure 1:
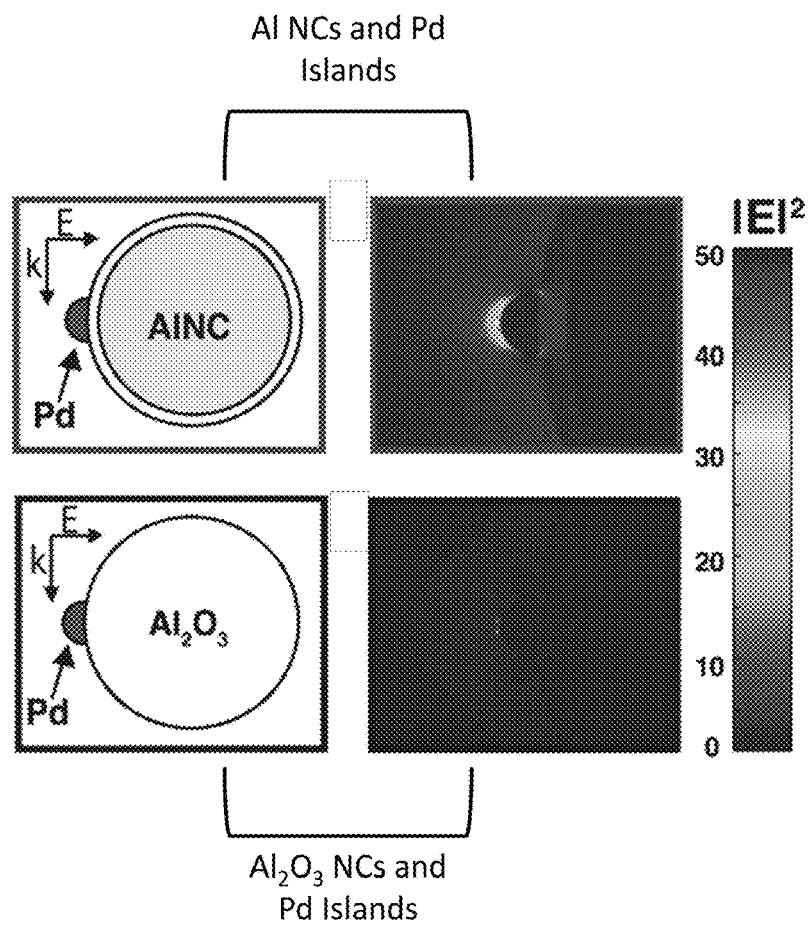
FIG. 1 shows graphical models and calculated near-field enhancement for both Pd—Al NC and Pd—$Al_2O_3$ NC systems.

In general embodiments disclosed herein relate to multicomponent plasmonic photocatalysts. More specifically, embodiments disclosed herein relate to photocatalysts that include a plasmonic material that may act as an optical antenna that modifies and improves the catalytic activity of a separate and distinct component acting as a reactive component. The multicomponent plasmonic photocatalysts disclosed herein can be engineered to include a plasmonic material that effectively absorbs light having wavelengths across to solar spectrum to improve the catalytic activity of a separate reactive component.

As will be discussed further, due to the vast array of possible combinations of plasmonic materials with reactive components, the embodiments disclosed herein introduce an unprecedented modularity to the design and optimization of photocatalytic materials, wherein the particular selection, and subsequent combination, of a plasmonic component and a reactive component may result in a unique photocatalyst that can operate at milder conditions while also possessing a reactivity profile with improved efficiency and selectivity.

Without being bound by theory, it is believed that when in operation the plasmonic component of the multicomponent photocatalyst acts as an optical antenna, capable of absorbing light from a physical area much larger than its geometric cross-section due to the unique interaction of light with plasmonic materials. The unique interaction of light with plasmonic materials is capable of generating strong electric fields on and near the plasmonic material surface as a result of the collective oscillation of electrons within the plasmonic material. This oscillation is known as a plasmon, and in the presently described multicomponent photocatalyst concept the strong electric field from the plasmonic material is optically coupled to the reactive component inducing a polarization, or "forced plasmon", within the reactive component. The optical coupling of the plasmonic material with the reactive component, that is the generation of a forced plasmon in the reactive component as a result of a plasmon on the plasmonic material, may occur even when the plasmonic material and the reactive component are separated by distances of up to about 30 nm.

The forced plasmon induced in the reactive component rapidly decays into energetic hot-carriers in the reactive component and these hot-carriers enable reactions to occur between adsorbate molecules on the reactive component surface under milder conditions than traditionally used during catalysis. In general, an optimal reactive component is not as effective at absorbing light as the plasmonic component and, thus, the combination of both the plasmonic component and the reactive component can synergize each of the components most useful functions (e.g., absorption or reactivity) into a modular multicomponent photocatalyst capable of operating as a photocatalyst more efficiently than each component on its own.

In one or more embodiments, the reactive component may also be electronically coupled to the plasmonic material. Specifically, hot carriers can be generated in the plasmonic material through plasmon decay and transfer to the reactive component to further drive chemical reactions for catalysts that are electronically conductive between the plasmonic material and the reactive components. In one or more embodiments, the reactive component may also be thermally coupled to the plasmonic material. Specifically, plasmonic materials strongly absorb light and converts some of the light energy into heat, which can thermally drive reactions on the reactive components closely associated therewith. The increase in local temperature is an advantage of plasmonic materials compared to other light absorbing materials.

In one or more embodiments, the plasmonic material may be any material with free carriers. In particular, the plasmonic material has free carriers that may include free holes, free electrons, or electrons in the conduction band. For example, the plasmonic material may be a metal, semiconductor, or a molecule. In one or more embodiments, the plasmonic material may be an insulator or a single-atom species. In one or more embodiments, the plasmonic material may be in general any metal or metalloid element on the Periodic Table of the Elements and alloys including said elements. In more specific embodiments, the plasmonic material may be, but is not limited to, gold (Au), silver (Ag), copper (Cu), aluminum (Al), and alloys including said elements. In the present disclosure the term "alloys" is intended to cover any possible combination of metals. For example, the alloys may be binary alloys such as AuAg, AuPd, AgPd, AuCu, AgCu, etc., or they may be ternary alloys, or even quaternary alloys. In one or more embodiments, the alloy may be a homogenous or heterogeneous alloy.

In one or more embodiments, the plasmonic material may be selected from $Bi_2Te_3$, Mg, ZrN, Bi, graphene, $MoS_2$, $WO_3$, ZnO, Pd, Ru, Rh, Pt, In, Ga, Co, Fe, GaN, $Cu_{2-x}S$, $Cu_{2-x}Te$, $Cu_{2-x}Se$, Li, K, Rb, Cs, TiN, or doped semiconductors including indium tin oxide (ITO), fluorine doped tin oxide (FTO), or doped silicon. In one or more embodiments, the plasmonic material may be a 2-dimensional material, such as single monolayer materials, nanosheets, nanoplates, or thin films. In general, 2-dimensional materials may be defined as materials that have two dimensions (e.g., length, width, and height) that are each independently at least 10 times the size of the other dimension, or at least 25 times the size of the other dimension, or at least 50 times the size of the other dimension, or at least 100 times the size of the other dimension.

In one or more embodiments, the plasmonic material may have at least a portion of its surface coated with a spacer material. A spacer material may physically separate or space the plasmonic component from the reactive component. In one or more embodiments, the spacer material may be a carbonaceous material, a nitride, a phosphide, a silicide, an arsenide, a selenide, a telluride, a hydride, a sulfide, a carbide, metal organic frameworks, covalent organic frameworks, a polymeric material, or an oxide. In one or more embodiments, the spacer material may be a crystalline material, an amorphous material, or a material that is a mixture of crystalline and amorphous.

In one or more embodiments, the plasmonic material may have an oxide shell as a spacer material, which surrounds the plasmonic material core of one of the metals or alloys listed above. In one or more embodiments, the oxide shell may be a natural/native oxide shell that forms upon a metal or alloys after exposure to air or water. For example, a copper plasmonic material may possess a copper oxide (e.g., CuO or $Cu_2O$) shell surrounding a copper core, or an aluminum plasmonic material may possess an aluminum oxide shell surrounding an aluminum core. In some embodiments, the oxide shell may be at least partially artificially produced, such as by artificially increasing the thickness of a native/natural oxide shell by appropriate chemical methods, or by chemically synthesizing, or otherwise depositing, an oxide material around a pre-formed plasmonic material. In one or more embodiments, the spacer material may have a thickness of up to about 30 nm, or up to about 25 nm, or up to about 15 nm. In one or more embodiments, the spacer material may have a single atom thickness or a thickness of at least about 0.5 nm, or at least 1 nm, or at least 1.5 nm. In more particular embodiments, the spacer material may have a thickness between about 1 nm and 5 nm.

In one or more embodiments, the plasmonic material may have a plasmon resonance, or optical absorption maximum, in the ultraviolet to infrared region of the electromagnetic spectrum. For example, in one or more embodiments, the plasmonic material has a plasmon resonance between wavelengths of about 180 nm to 10 microns. In one or more embodiments, the plasmon resonance is at least any value between about 180 nm and 380 nm. In one or more embodiments, the plasmon resonance may be at most any value between 760 nm and 10 microns. More specifically, the plasmonic material may have a plasmon resonance, or optical absorption maximum, in the visible region (e.g., at a wavelength between about 380 nm-760 nm) of the electromagnetic spectrum. Those with skill in the art will appreciate that, in addition to the material's elemental composition, the size and shape of the plasmonic material, as well as the environment/medium that the plasmonic material is in may affect its LSPR. Therefore, any material having a size and/or shape that can achieve a plasmon resonance, or optical absorption maximum, in the ultraviolet to infrared region of the electromagnetic spectrum when in an environment that is substantially air or water is intended to be covered by the present application.

As stated above, a material's elemental composition, its size, and its shape may all affect its LSPR. As the plasmonic materials described herein may take different shapes including, but not limited to sheets (e.g., 2-dimensional), wires (e.g., 1-dimensional), rods, cuboidal, spherical, or spheroidal (i.e. approximately spherical), etc. The size of the plasmonic material may be a dimension that equates to the longest edge length or to the diameter of a circumscribing sphere for spherical and spheroidal plasmonic particles. In one or more embodiments, in general the plasmonic material may have at least one dimension with a size between about 1 nm and 300 nm or between about 5 nm and 200 nm. More specifically, for specific metals the plasmonic material may have at least one dimension with a size as follows: Ag—5 nm-150 nm for visible LSPR, Au—5 nm-200 nm for visible and IR LSPR, Cu—1 nm-200 nm for a visible LSPR, and Al—10 nm-50 nm for UV LSPR and 50 nm-200 nm for visible LSPR.

In general, the reactive component may be any compound capable of catalyzing a reaction. In one or more embodiments, the reactive component may be a metal, semiconductor, insulator, single atom species, ionic species, organic molecules, metal complexes, or atomic cluster species with between 2 and $3 \times 10^7$ atoms. In one or more embodiments, the reactive component may be selected from transition metals, lanthanides, actinides, oxides, sulfides, hydrides, nitrides, carbides, silicides, phosphides, arsenides, selenides, tellurides, anchored ligands containing organic and inorganic functionality, metal organic frameworks, or covalent organic frameworks. In one or more embodiments, the reactive component may be any metal or metalloid element on the Periodic Table of the Elements and alloys, oxides, phosphides, and nitrides including said elements. Further, the reactive component may be any oxides. In one or more embodiments, the reactive component is a transition metal or a transition metal oxide. In one or more embodiments, the reactive component is a transition metal alloyed at the surface of the plasmonic material to form a surface alloy particle where the bulk of the particle is plasmonic material and substantially all of the reactive component is present at the surface of the particle.

More specifically, in some embodiments the reactive component may be selected from nanoparticles of metals including at least one of palladium (Pd), platinum (Pt), ruthenium (Ru), rhodium (Rh), nickel (Ni), iron (Fe), cobalt (Co), iridium (Ir), osmium (Os), titanium (Ti), vanadium (V), indium (In) their alloys, their oxides, their phosphides, and their nitrides. Further, in one or more embodiments, the reactive component may be intermetallic nanoparticles, core-shell nanoparticles, and semiconductor nanoparticles (e.g., $Cu_2O$) including the metal and metalloid elements of the Periodic Table of the Elements. In one or more embodiments, the reactive component may be monometallic, bimetallic, or multimetallic nanoparticle islands, shells, or discrete atomic sites located on the plasmonic component. Those with skill in the art will appreciate that, in addition to the reactive component's elemental composition, the size and shape of the reactive component may affect its substrate adsorption properties, chemical reactivity, and reaction selectivity.

In one or more embodiments, the reactive component may have at least one dimension with a size of at least an atomic diameter of a metal or ion. For example, the reactive component may have at least one dimension with a size of at least 30-300 picometers. In one or more embodiments, the reactive component may have at least one dimension with a size of at most 100 nm, or at most 75 nm, or at most 50 nm, or at most 25 nm, or at most 15 nm.

In one or more embodiments, the reactive component may be physically or chemically attached to the surface of the plasmonic component, while in other embodiments the reactive component may be separated by a distance from the plasmonic component. The separation may be either by empty space (i.e., a distinct physical separation) or the separation may be by a spacer material discussed above. For example, the plasmonic component and the reactive component of the multicomponent photocatalysts may be separated by a small distance when they are prepared via lithographic methods to have a distinct physical separation. In one or more embodiments, the small separation may be a distance of up to about 30 nm, or up to about 25 nm, or up to about 15 nm. In one or more embodiments, the small separation may be at least about 0.1 nm, or at least 2 nm, or at least 5 nm or at least 10 nm. In one or more embodiments, a plurality of reactive components may be physically attached to the surface of a single plasmonic component, which can increase the surface area available for reactions. In one or more embodiments, the reactive component may form a shell that surrounds, either completely or substantially (e.g., greater than 50%), the surface of the plasmonic component.

In general, the reactive component can be used to perform any reaction that it is capable of performing without it being optically coupled to a plasmonic component. In one or more embodiments, the reactive component may be capable of oxidation and reduction chemistry, water or air pollution remediation reactions, NOx and $N_2O$ decompositions, catalyzing hydrogenation reactions, such as acetylene hydrogenation, carbon dioxide conversion to carbon monoxide via the reverse water-gas shift reaction (which can be coupled with a hydrogenation to create hydrocarbons using Fisher-Tropsch synthesis), and nitrogen activation chemistry, including the synthesis of ammonia. Additional specific reactions that may be performed efficiently by the reactive component in multicomponent photocatalysts described herein may include methane steam/dry reforming, ammonia decomposition, nitrous oxide decomposition, reverse water gas shift, water gas shift, and the selective reduction of acetylene. While specific reactions are indicated above it is to be understood that any catalytic reaction currently performed using a single reactive component may be enhanced by incorporating a plasmonic component and forming a multicomponent photocatalyst as described herein.

In one or more embodiments, the multicomponent photocatalysts may be a plasmonic material that is alloyed at its surface with a reactive component. That is to say that the bulk or core of the plasmonic material is unalloyed and includes only the plasmonic material, while at the surface (i.e., at least the first layer and up to the first three layers of the plasmonic material) a reactive component is alloyed with the plasmonic material. Multicomponent photocatalysts of this type may be referred to as surface alloys or heterogeneous alloys. In surface alloys the electronic structure of the plasmonic material and the surface alloyed reactive component are substantially similar to the electronic structures expected for each component separately (i.e., in a non-alloyed state) and as a result the plasmonic material maintains a strong LSPR and the reactive component maintains high interaction with substrate molecules and high catalytic activity. Moreover, a surface alloyed multicomponent photocatalyst may significantly improve atomic utilization and thereby reduce cost by segregating the often costly reactive component specifically at the surface where it is needed for catalysis. Thus, the amount of reactive component necessary may be significantly reduced when compared with conventional catalysts that include substantial amounts of reactive component in interior sites that are not actually available for catalysis.

Surface alloys may be formulated that combine a plasmonically active material with a catalytically active reactive component that is atomically dispersed in the surface layer of the plasmonically active material. Atomic dispersion is understood to mean that the reactive component is randomly and atomically distributed at surface sites of the surface alloy particle. Thus, a surface alloy combines two or more functional components (e.g., plasmonic and reactive) synergistically in a single structure or discrete particle. In one or more embodiments, a surface alloy multicomponent photocatalyst may include a plasmonic material selected from Al, Ag, Au, and Cu and a reactive component selected from a transition metal, wherein the reactive component is alloyed with the plasmonic material at the surface. In one or more embodiments, the transition metal may be selected from Pd, Ru, Rh, Pt, and Ni. In one or more embodiments, the molar ratio of plasmonic material to reactive component in a surface alloy may be between 1000:1 to 10:1 or between 400:1 to 20:1. When the amount of reactive component is too small the reactivity of the multicomponent photocatalyst may be too low. However, when the amount of reactive component is too high either a shell or multiple layers of reactive component may form on the plasmonic component instead of a surface alloy. In a more specific embodiment, the plasmonic material may be Cu and the reactive component may be selected from a transition metal.

In general, the method of making the multicomponent photocatalysts is not intended to be particularly limited. In one or more embodiments, the multicomponent photocatalysts may be created using any method that results in a plasmonic material having at least one reactive component physically or chemically attached thereto or that results in a reactive component that is separated a distance from the plasmonic material. For example, the multicomponent photocatalyst may be created via a colloidal method wherein the plasmonic material is created first by the decomposition or reduction of a plasmonic pre-cursor compound (e.g., aluminum hydride or an organoaluminum compound for aluminum plasmonic materials). A transition metal salt, transition metal carbonyl complex, or other reactive component pre-cursor may then be added to a solution containing the plasmonic material (or a pre-cursor compound) and subsequently or concurrently reduced to form metallic, metal oxide, or semiconducting reactive component islands/particles or shells on or around the plasmonic material. The multicomponent photocatalysts thus formed may be isolated by centrifugation or any other method capable of separating the multicomponent photocatalysts from solution.

In one or more embodiments, the surface alloys described above may be formed by a co-precipitation process, whereby pre-cursors of the plasmonic material and pre-cursors of the reactive component are dissolved in a liquid to form a pre-cursor solution before precipitation is induced to form intimately mixed co-precipitated particles. In one or more embodiments, precipitation may be induced by adding the pre-cursor containing solution to a basic solution or vice-versa. For example, the pre-cursor solution and the basic solution may be added simultaneously or sequentially together in order to induce precipitation. In one or more embodiments, the pre-cursor solution and the basic solution may be added together dropwise. In one or more embodiments, the pre-cursor solutions, the basic solution, and/or the solution formed during and after mixing the pre-cursor solutions and the basic solution may be held at a temperature between about 40° C. and 150° C. In one or more embodiments, the slurry resulting from the precipitation may be held at a temperature between about 40° C. and 150° C. for 1-24 hours after the precipitation. In one or more embodiments, the basic solution may be made from at least one of alkali metal carbonate, alkali metal bicarbonate, and alkali metal hydroxide dissolved in an aqueous solution. In one or more embodiments, pre-cursors of a support material may also be dissolved in the initial pre-cursor solution and co-precipitated along with the pre-cursors of the plasmonic material and pre-cursors of the reactive component. In one or more embodiments, the pre-cursors of the plasmonic material, the reactive component, and the support material may be transition metal salts and they may be dissolved in an aqueous solution.

In one or more embodiments, the metal salts are dissolved in the pre-cursor solutions to match the molar ratio of the desired precipitated compound. For example, when targeting the formation of a Mg—Al hydrotalcite ($Mg_6Al_2CO_3(OH)_{16}(H_2O)_4$ support the precursor solution is formulated to have a 3:1 molar ratio of Mg:Al. Additionally, there are other hydrotalcites with a combination of a bivalent metal cation and a trivalent metal cation that may be used as support materials. Further, the ratio of the plasmonic material pre-cursor to the reactive component pre-cursor may be tuned to match the molar ratio of metals in the targeted surface alloy. In one or more embodiments, the molar ratio of metal in the plasmonic material to the metal in the reactive component may be between 1000:1 to 10:1 or between 400:1 to 20:1. Finally, the amount of pre-cursors used may be tuned so that the support material may be between 99.9% to 20% by weight of the precipitate, or between 95% and 40% by weight of the precipitate, or between 90% and 60% by weight of the precipitate.

The co-precipitated particles may then be collected from solution (e.g., by centrifugation, gravity sedimentation, etc.) and annealed at an elevated temperature to form the surface alloy particles. When the co-precipitated particles include a support material precipitated therewith, the annealing results in supported surface alloy particles. In one or more embodiments, the collected co-precipitated particles may be washed by successive cycles of dispersion in water followed by collection by centrifugation prior to the annealing. In one or more embodiments, the annealing may be performed at least partially in a reducing atmosphere. In one or more embodiments, the annealing is performed initially in an inert atmosphere, followed by annealing in a reducing atmosphere. In one or more embodiments, regardless of the atmosphere used the annealing may be performed at a temperature between 200° C. and 1000° C. or between 400° C. and 700° C. In general, the higher the temperature during the annealing process the larger the multicomponent plasmonic photocatalyst particles that will form.

In one or more embodiments, the reducing atmosphere may include a component that induces the segregation and enrichment of the reactive component on the surface of the annealed particle to form a surface alloy. Such a component may be referred to as a enrichment agent. For example, CO may be included in a reducing gas stream because CO may preferentially bind to the reactive component over the plasmonic material and the preferential binding can induce the segregation and enrichment of the reactive component at the surface to form a surface alloy particle during the annealing. In one or more embodiments, the inclusion of $H_2$, $NH_3$, and hydrocarbons in the gas stream during annealing may also function to segregate/enrich the reactive component on the surface of the anneal particle to form a surface alloy. In one or more embodiments, the annealing process may occur in the reaction chamber prior to catalytic reaction. That is, the surface alloy multicomponent photocatalyst may be formed by an activation step that includes annealing in the reaction chamber prior to catalytic reaction.

Lithographic and other deposition processes may also be employed to form multicomponent photocatalysts. For example, colloidal lithography may be used to deposit a plasmonic material and a reactive component onto an inert substrate. By varying the deposition parameters, e.g., deposition angle and the resist thickness, the spacing between the plasmonic material and the reactive component, and therefore the reactivity, of the multicomponent photocatalysts may be manipulated. Further, lithographic processes may be used to create arrays of multicomponent photocatalysts. The lithographic and deposition processes that may be used to form multicomponent photocatalysts include, but are not limited to, electron beam lithography, photolithography, atomic layer deposition, chemical vapor deposition, thermal evaporation, nanoimprint lithography, templated growth, and sputtering.

The use of the multicomponent photocatalysts described herein is not intended to be particularly limited and, in general, the multicomponent photocatalysts may be integrated into existing photocatalyst system and utilized similarly to any known photocatalyst. For example, multicomponent photocatalysts as described herein may be used in a pack-bed reactor system, dispersed in a solvent, dispersed in a gas phase, or illuminated on a surface. In one or more embodiments, the multicomponent photocatalyst or a multicomponent photocatalyst pre-cursor is processed into a pellet or film/thin layer prior to loading into the high-temperature reaction chamber. Such processing may be accomplished by known methods. In some embodiments, the multicomponent photocatalysts may be dispersed onto a support material prior to being loaded into a reaction chamber and being exposed to molecular reactants for the particularly targeted reaction. The support material may generally include insulating and semiconducting materials that have minimal optical absorption in the visible spectrum. In one or more embodiments, the support material may include aluminum oxides, silicon oxides, magnesium oxides, titanium oxides, zinc oxide, zirconium oxide, tungsten oxide, iron oxides, calcium oxide and the like. In one or more embodiments, the support material may be one selected from carbides, nitrides, sulfides, carbon materials, and two-dimensional transition metal dichalcogenides. In one or more embodiments, the carbon material may be selected from activated carbon, charcoal, graphite, graphene, and graphene oxide. In one or more embodiments, the support material may be an aerogel. In one or more embodiments, the multicomponent photocatalysts may be dispersed on a support material at a weight percent between about 0.1 and 30 or at a weight percent between about 0.1 and 5 percent. In other embodiments, the multicomponent photocatalysts may be used as a catalyst even when they are not supported on a support material.

In general, the reaction chamber will be engineered to allow for illumination of the multicomponent photocatalysts with a light source in order to utilize the plasmon induced reactivity provided by the multicomponent photocatalysts. In one or more embodiments, the illumination may be tuned to be a wavelength on-resonance with the LSPR, leading to increased light absorption. Wavelength tuning may also be employed to use specific wavelengths that may resonate with certain reactant or intermediate molecules, which may help control reaction selectivity. The net energy transfer from plasmon resonance to intermediates on the surface can induce a nonthermal desorption of molecules and intermediates that control the selectivity in chemical reactions.

In one or more embodiments, the illumination may use high light intensities, i.e., light intensities that are greater than the average illumination of the sun (>100 mW/cm$^2$), to provide more photon energy for the system. In one or more embodiments, the reaction medium (i.e., the environment surrounding the reactants and the catalyst) is only heated by photothermal heating induced by illuminating the contents of the reaction chamber. That is, in some embodiments there is no external heating provided to the reaction medium in order to thermally drive the reaction. However, in one or more embodiments, the reaction medium may be heated by an external heat source. For example, a heated gas may be flowed through the reaction chamber in order to externally heat the reaction medium. In embodiments where the reaction medium is a liquid, then the liquid may be externally heated. In general, heating can decrease reaction barriers at the catalyst surface, allowing lower energy photons to be utilized in any reaction taking place. In one or more embodiments, the overall temperature within the reaction chamber may maintain a temperature below about 250° C., or below about 200° C., or even below about 180° C. during the reaction. It is to be understood that, while the overall temperature may meet the above conditions, the catalyst itself may be locally heated higher than above due to photothermal heating. Moreover, in one or more embodiments, the reaction medium may be externally cooled in order to control the temperature from rising beyond a certain point. Further, in some embodiments the temperature within the reaction chamber may be as high as 1000° C. and the illumination may serve to further increase the efficiency of the thermocatalysis.

EXAMPLES

Synthesis of Aluminum Nanocrystals (Al NCs)

Al NCs with an average diameter of 100 nm with a 2 nm-4 nm self-limiting oxide surface layer were chemically synthesized. Briefly, 5 mL of anhydrous tetrahydrofuran (THF) and 15 mL of anhydrous 1,4-dioxane (Sigma-Aldrich) were mixed in a 100 mL dry Schlenk flask under an Ar atmosphere at 40° C. Under stirring, 6.5 mL of N,N-dimethylethylamine alane (0.5 M in toluene, Sigma-Aldrich) was injected into the reaction vessel, followed by rapid injection of 0.5 mL of 2 wt % Ti(O$^i$Pr)$_4$ in toluene. The color of the solution turned to brown within a few seconds, and to black/gray within an hour, indicating formation of Al NCs. The reaction was allowed to proceed for two hours at 40° C., before being removed from the heat source. 1 mL of oleic acid was injected into the mixture to quench the reaction. The as synthesized nanoparticles were isolated by sonication and centrifugation at 2000 relative centrifugal force (r.c.f.) in dry toluene, followed by three cycles of washing and centrifuging in 2-propanol (IPA). Finally, Al NCs were dispersed in IPA and the solution purged by Ar and stored at room temperature for future use.

Example 1—Synthesis and Testing of Pd Decorated Al NCs 17.7 mg of PdCl$_2$ (anhydrous, 99.999% Sigma-Aldrich) were dissolved in 10 mL of anhydrous acetonitrile (Sigma-Aldrich) over 24 hours to produce a 0.01M solution of PdCl$_2$(MeCN)$_2$. 10 mL of 2-propanol and 5 mL of pre-dispersed AlNC was placed into a 50 mL single-neck round bottom flask attached with a reflux condenser. The solution was brought to reflux before injecting 3 mL of PdCl$_2$(MeCN)$_2$. Reactions were refluxed between 10 and 60 minutes to yield Pd-decorated AlNCs. Nanoparticles were isolated by centrifuging at 1000 r.c.f. and washing three times with acetonitrile before finally dispersing in 2-propanol. Alternatively, similar volumes of reagents can also be prepared at room temperature to decrease Pd coverage.

The upper two panels of FIG. 1 show a simplified model of a Pd—Al NC (reactive component—plasmonic component) multicomponent photocatalyst (left) and the calculated near-field enhancement in the Pd island for the model multicomponent photocatalyst (right). The bottom two panels of FIG. 1 show comparable models for a similarly sized Pd—$Al_2O_3$ NC system. It is shown that the near-field enhancement in the Pd-island is over an order of magnitude greater in the case of the Al NC model when compared to the $Al_2O_3$ model, due to the plasmon induced near fields at the Al NC surface.

Figure 2:
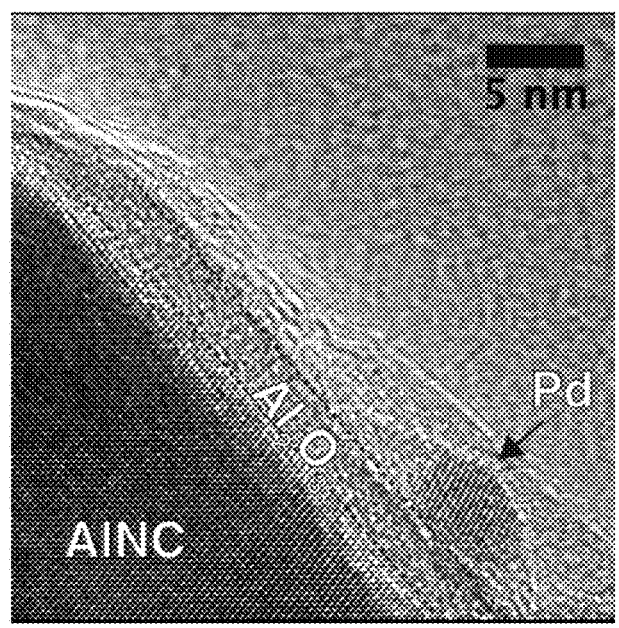
FIG. 2 shows a high resolution transmission electron microscope (HRTEM) image showing a chemically synthesized Pd—Al NC.
Figure 3:
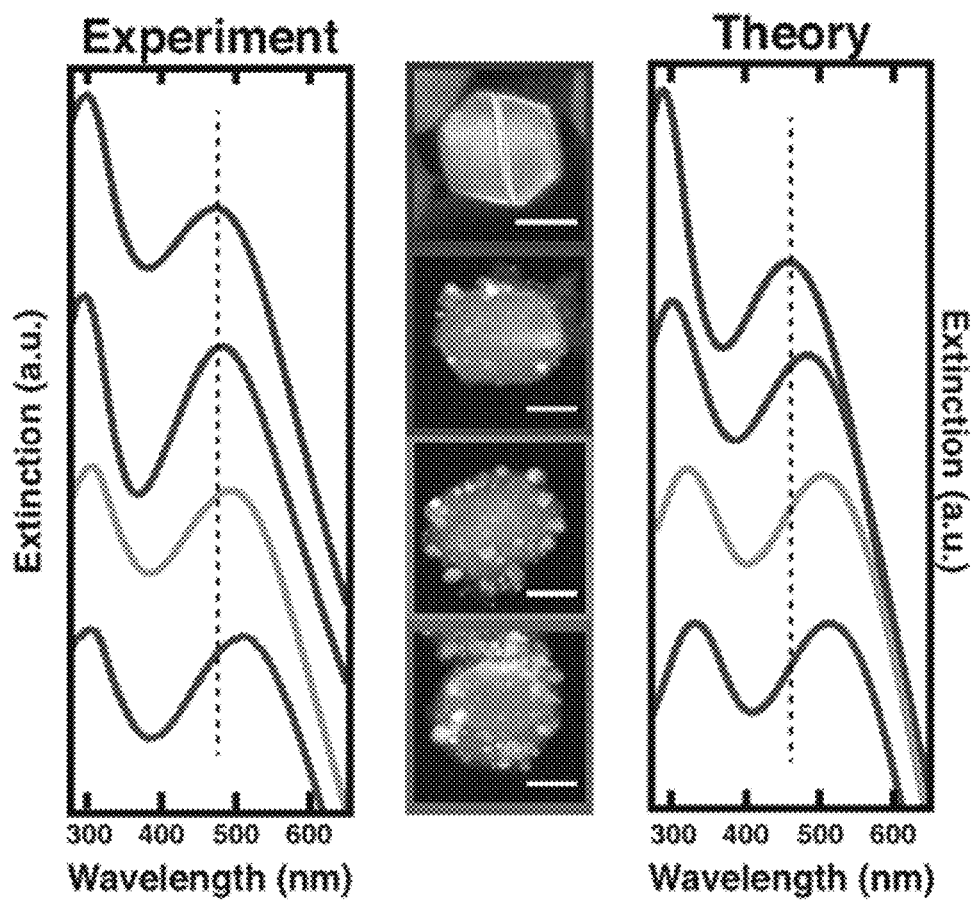
FIG. 3 shows the optical properties of the chemically synthesized Pd—Al NC with increasing Pd coverage as predicted by theory (right) and as obtained experimentally (left).

FIG. 2 shows a high resolution transmission electron microscope (HRTEM) image showing a chemically synthesized Pd—Al NC. The Al NC with a thin $Al_2O_3$ shell separating the Pd deposited thereon is clearly depicted. FIG. 3 shows the optical properties of the chemically synthesized Pd—Al NC with increasing Pd coverage as predicted by theory (right) and as obtained experimentally (left). From top to bottom, pristine Al NCs with a dipolar plasmon resonance at 465 nm, 10 minutes refluxing with $PdC_2$, 30 minutes refluxing with $PdCl_2$, 60 minutes refluxing with $PdCl_2$. Increasing Pd coverage shows a redshift of the dipolar LSPR due to the real part of the Pd permittivity and an increased damping of the quadrupolar mode at 300 nm due to the imaginary part of the Pd permittivity. Further, TEM images showing a particle of each specimen that is optically interrogated are shown in the same order in the middle of FIG. 3 (Scale Bar=50 nm).

Hydrogen-Deuterium Exchange Method—A customized stainless steel gas-phase high temperature reaction chamber (Harrick Scientific Product, Inc.) was used to mimic packed-bed reactor conditions using Pd-decorated Al NCs prepared in refluxing IPA and loaded at 0.5 wt % on $\gamma$-$Al_2O_3$ as a support. A combination of research purity $H_2$ and $D_2$ (Matheson TRIGAS; 99.9999%) gases were flowed into the reaction chamber at each 15 standard cubic centimeters per minute (sccm). HD production was monitored using a quadrupole mass spectrometer (Hiden Analytical Inc.) to continuously monitor HD (m/z=3) production in real time. For wavelength and power dependent measurements, a tunable Ti:Sapphire laser (Coherent, Chameleon Ultra II, 150 fs, 80 MHz, 680-1080 nm, bandwidth of approximately 10 nm) equipped with a second harmonic generator (Angewandte Physik und Elektronik GmbH, output wavelength 350-530 nm) was used as a monochromatic light source. Wavelength-dependent measurements were performed at wavelengths with a minimum of 50 mW. Power-dependent measurements were performed at 492 and 800 nm corresponding to the dipolar plasmon resonance and Al interband transitions, respectively, as measured using UV-Visible spectroscopy. Thermal activity was quantified in a similar manner, but through heating with a Harrick ATC-024-3 temperature controller.

Figure 4:
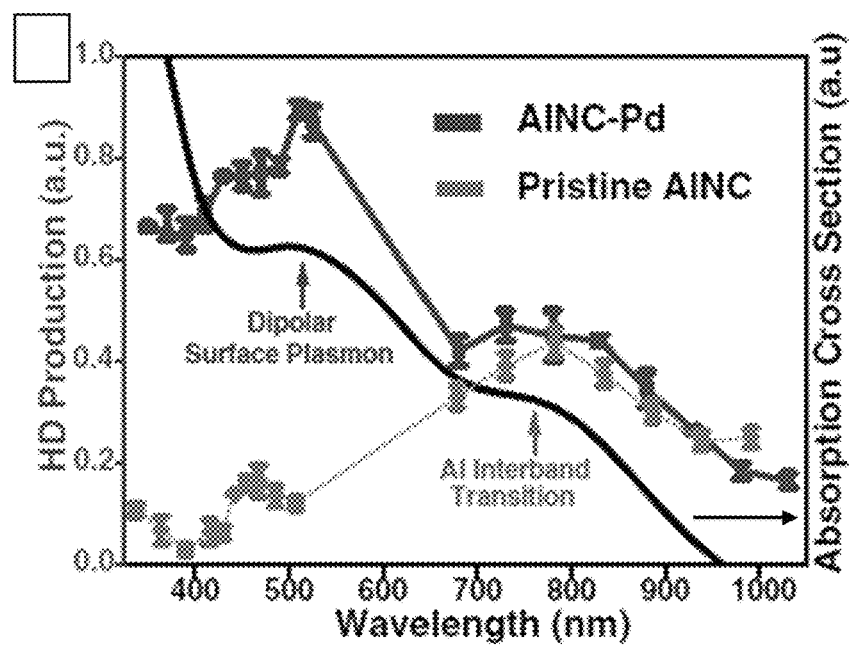
FIG. 4 shows photocatalytic activity for the hydrogen-deuterium exchange reaction using Pd—Al NC and Pristine Al NC.

FIG. 4 shows the photocatalytic activity for the hydrogen-deuterium exchange reaction. More specifically, FIG. 4 shows the wavelength dependence of $H_2$ desorption on Pd—Al NC (solid line connecting data points) and pristine Al NC (dashed line connecting data points) and the calculated absorption cross-section of Pd—Al NC. The sample was irradiated with a power density of 5 W/cm$^2$ at all wavelengths. As seen in FIG. 4, for the Pd—Al NC complex (solid line connecting data points), the wavelength dependence of HD production closely follows the calculated absorption cross section supporting a hot-carrier mechanism. When qualitatively compared with pristine Al NCs (dashed line connecting data point), the wavelength dependence of HD production is dramatically different, with the maximum HD production for the pristine Al NCs occurring at a photoexcitation wavelength of 800 nm, corresponding to the interband transition of Al.

Figure 5:
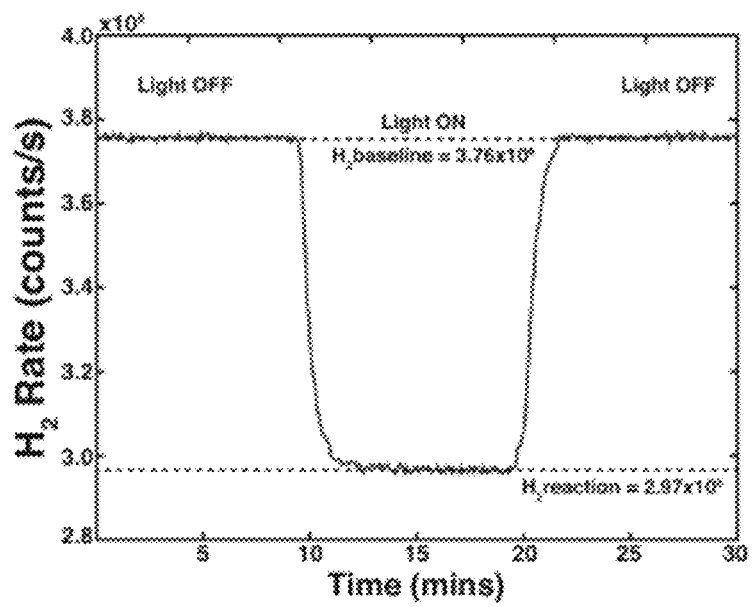
FIG. 5 shows the quantitative consumption of $H_2$ at the dipolar LSPR of Pd—Al NC.

FIG. 5 shows the quantitative consumption of $H_2$ at the dipolar LSPR of Pd—Al NC. Pd—Al NC multicomponent photocatalysts show nearly two orders of magnitude greater reactivity than pristine Al NCs. More specifically, FIG. 5 shows the baseline levels of $H_2$ as monitored by mass spectrometry. When 110 mW of 492 nm (dipolar resonance) light is illuminated onto a 0.5 wt % Pd—Al NC sample, the $H_2$ signal decreases from $3.76 \times 10^6$ c/s to $2.97 \times 10^6$ c/s, meaning that $0.79 \times 10^6$ c/s of $H_2$ was consumed in the hydrogen-deuterium exchange reaction. Accordingly, $(0.79/3.76) \times 100\% = 21.0\%$ of the $H_2$ is consumed. The total flow of $H_2$ into the system was 15 sccm (standard cubic centimeters per minute), therefore the total consumption of $H_2$ is (15 mL/min×0.2101)/60 s=0.053 mL/s. Under experimental conditions (25° C.; 1 atm) the molar volume of $H_2$ would be 22.4 L/mol, so the total number of moles of $H_2$ transformed into HD is $2.34 \times 10-6$ mol/s, which means $1.41 \times 10^{18}$ $H_2$ have reacted.

Figure 6:
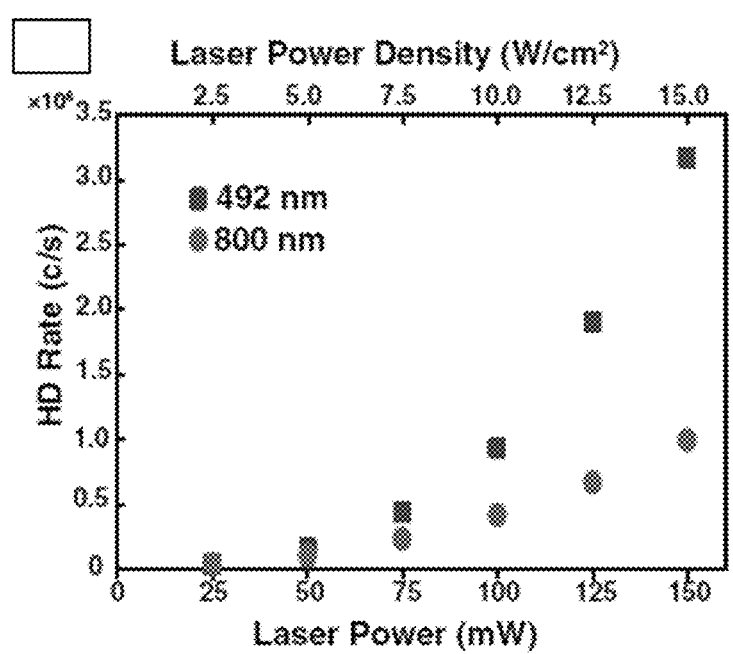
FIG. 6 shows the excitation laser power dependence of the hydrogen-deuterium exchange reaction using the Pd—Al NC multicomponent photocatalysts measured at 492 nm and 800 nm, corresponding to the dipolar plasmon resonance and Al interband transition, respectively.

FIG. 6 shows the excitation laser power dependence of the reaction using the Pd—Al NC multicomponent photocatalysts measured at 492 nm and 800 nm, corresponding to the dipolar plasmon resonance and Al interband transition, respectively. The plot in FIG. 6 shows a supralinear response at both wavelengths. Such supralinear responses with increasing optical power density have been suggested as a hallmark of hot-carrier-driven chemistry on nanoparticle surfaces.

Figure 7:
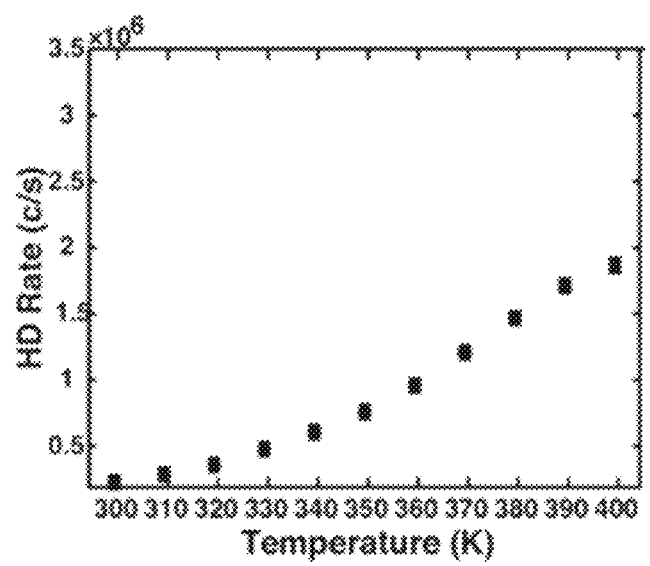
FIG. 7 shows temperature dependent reaction activity measurements for the hydrogen-deuterium exchange reaction at temperatures between 300 K and 400 K using the Pd—Al NC without external illumination.

FIG. 7 shows temperature dependent reaction activity measurements between 300 K and 400 K using the Pd—Al NC without external illumination. These measurements show an increase in HD generation with increasing temperature; however, the calculated wavelength-dependent local maximum temperature increase expected on the nanoparticle surface is only between 2 K and 16 K for Al and Pd surfaces, respectively, within the experimental range of excitation laser power densities. Such small local temperature increases under illumination suggest that, although photothermal heating of the Pd lattice may contribute slightly to $H_2$ desorption, the primary cause can be attributed to the excitation of photoexcited hot carriers in the multicomponent photocatalyst.

Acetylene Reduction—A customized stainless steel gas-phase high temperature reaction chamber (Harrick Scientific Product, Inc.) was used to mimic packed-bed reactor conditions using Pd decorated Al NCs prepared at room temperature and loaded at 0.5 wt % on $\gamma$-$Al_2O_3$ as a support. $N_2$ (Matheson TRIGAS; 99.9999%), $H_2$ (Matheson TRIGAS; 99.9999%), and $C_2H_2$ (Praxair 5.02% in He), were flowed through the reaction chamber at 10.5, 0.5, and 4 sccm, respectively. The reduction of acetylene was monitored using a Shimadzu GC-2014 gas chromatograph connected directly to the exhaust gas from the reaction chamber. Thermal activity was quantified in a similar manner, but through heating with a Harrick ATC-024-3 temperature controller.

Figure 8:
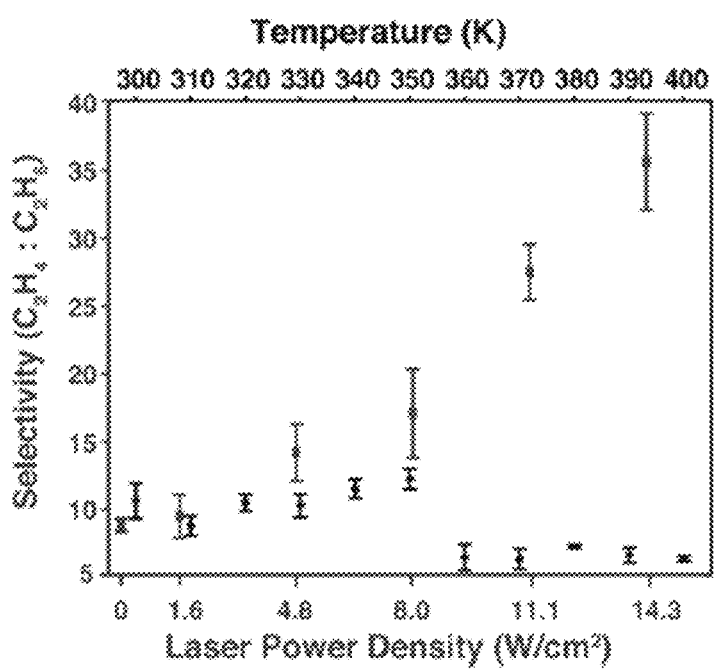
FIG. 8 shows a plot of the selectivity of acetylene reduction using the Pd—Al NC as a function of temperature or laser power density.

The photocatalytic properties of the Pd—Al NC multicomponent photocatalysts are translatable to other chemical reactions, such as hydrogenation. One important and industrially relevant reaction is the selective reduction of acetylene. Ethylene is a commodity chemical precursor used in the production of polyethylene-based materials with widespread commercial use; however, under traditional thermal conditions, ethane is also produced in a side reaction during hydrogenation of acetylene. As shown in FIG. 8, with Pd—Al NC multicomponent photocatalysts, we have found a drastic increase in the selective reduction of acetylene to ethylene under white-light illumination (data points at higher selectivities at 4.8 W/cm² and beyond) when compared to traditional thermal reduction (data points with lower error bars whose selectivity drops off at ~360 K). The selectivity also shows a large increase with increased laser power density. An increase in ethylene:ethane product ratio from ~7 to ~37 is observed for the photo-hydrogenation case. In contrast, traditional thermal heating of the Pd—Al NC complexes showed that ethylene:ethane selectivity leveled off at a maximum of ~10:1 before showing a drop to ~6:1 at 360 K (black).

Figure 9:
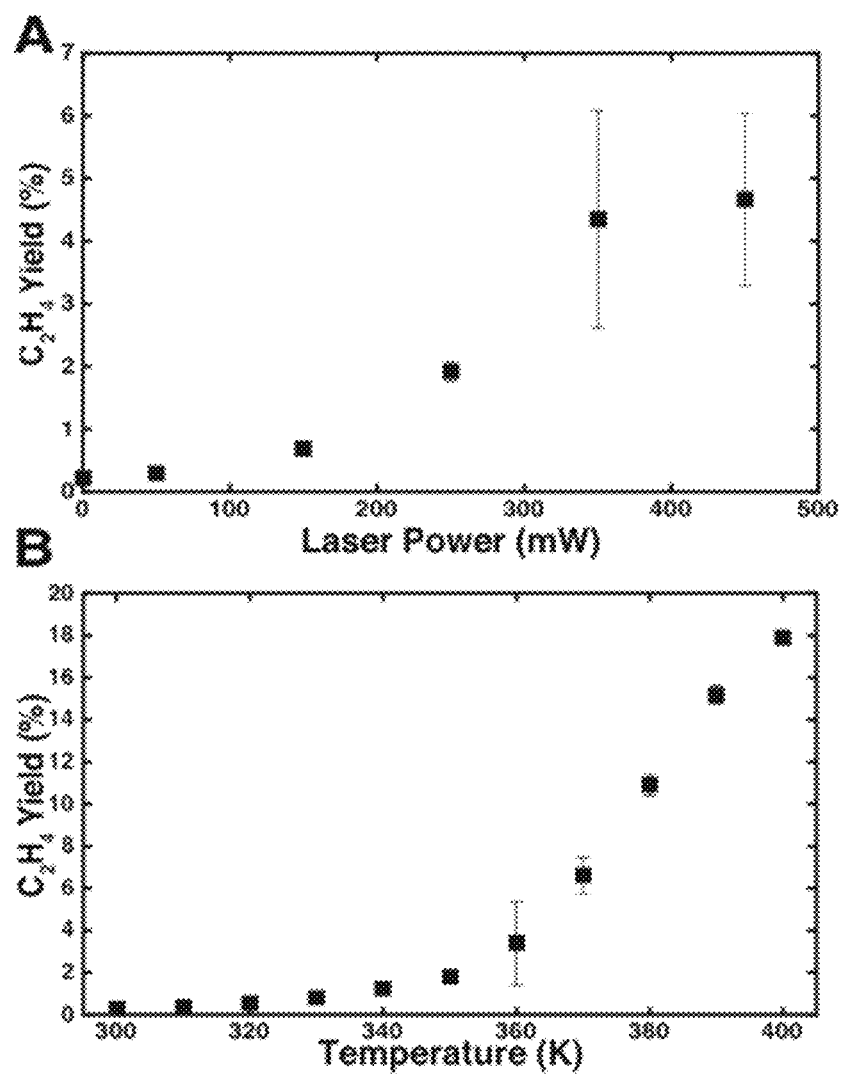
FIG. 9 shows representative gas chromatogram yields for ethylene for both photo-hydrogenations of acetylene (A) and thermal hydrogenations of acetylene (B) using the Pd—Al NC multicomponent photocatalysts.

FIG. 9 shows representative gas chromatogram yields for both photo-hydrogenations (A) and thermal hydrogenations (B) using the Pd—Al NC multicomponent photocatalysts. Photo-hydrogenation yields (A) show an increase with laser power, but an overall limited yield likely due to starving the surface of dissociated 1-12 at high powers. Thermal hydrogenation yields (B) show notably higher yields at 360 K, the same temperature associated with a decrease in ethylene selectivity (See, FIG. 8).

That selectivity enhancement is seen in photo-hydrogenation, yet not seen in traditional thermal hydrogenation, is likely due to the availability of dissociated $H_2$. In both photo-hydrogenation and thermal hydrogenation cases, acetylene adsorbs on the surface and undergoes the first and second hydrogenations to produce ethylene. At this point, two forward reaction pathways are possible: ethylene desorption or subsequent hydrogenation of ethylene to produce ethane. Both desorption and hydrogenation of ethylene from Pd(111) are known to have similar activation barriers within the margin of error of previous DFT calculations. Therefore, the availability of dissociated $H_2$ dictates the branching ratio between these two reaction pathways.

In photocatalytic hydrogenations, plasmon induced hot carriers lead to rapid desorption of $H_2$, biasing the equilibrium toward desorption and thus limiting the availability of hydrogen on the surface for additional hydrogenation of ethylene. The hypothesis of hot-carrier-induced H-starved surfaces leading to increased selectivity is also backed up by reduced yields of ethylene in the photocatalytic hydrogenation case (See, FIG. 9 plot (A)). With illumination, there is less surface-activated $H_2$ which also reduces the likelihood of the first and second hydrogenations of acetylene needed to produce ethylene. In thermal hydrogenations, ethylene yields are higher (T>360 K) at the expense of reduced selectivity, most likely due to minimal changes in dissociated $H_2$ surface coverage, and enough kinetic energy in the system to overcome the activation energies and favor subsequent hydrogenations of ethylene. The selectivity increase observed for the photo-hydrogenation of acetylene could open doors for developing more selective hot-carrier-driven chemistry.

Example 2—Synthesis and Testing of Al@Cu$_2$O

For the synthesis of Al@Cu$_2$O, 2.5 mL of as synthesized Al NCs (1 mg/mL in IPA) were transferred to an oven-dried Schlenk flask and the total volume of the solution adjusted to 10 mL using IPA. The reaction solution was degassed at room temperature for about an hour and then under Ar atmosphere the flask was heated to reflux. While refluxing, 1 mL of 0.01 M fresh Cu (II) acetate (99.999% trace metal-basis, Sigma-Aldrich) in dry acetonitrile was rapidly injected into the reaction with constant stirring. The reflux continued for 2 hours to yield Al@Cu$_2$O nanoparticles. The as-synthesized nanoparticles were isolated by centrifuge at 2000 r.c.f. and washed three times with IPA, and finally dispersed in IPA.

Figure 10:
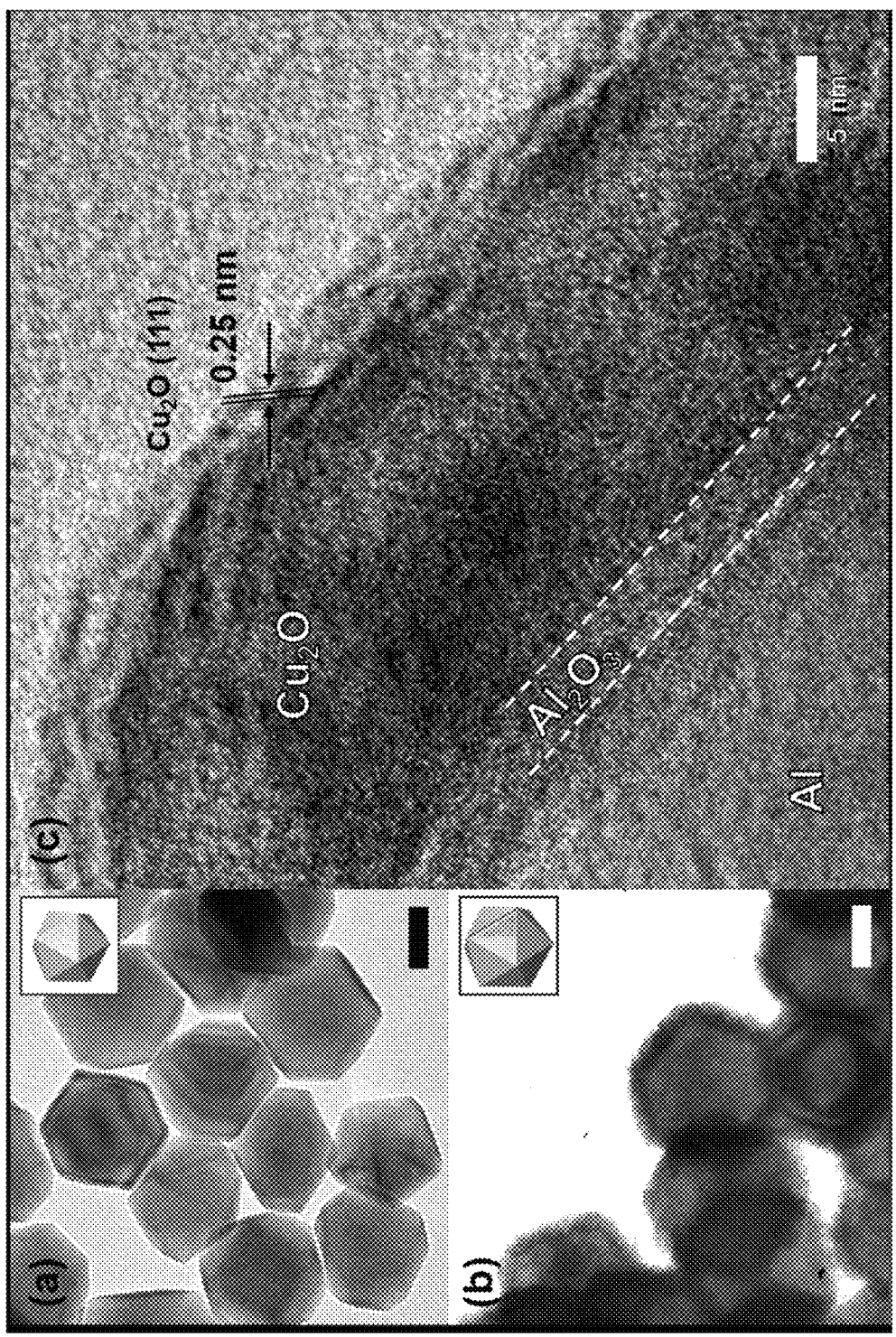
FIG. 10 shows TEM images of Al@$Cu_2O$ particles formed by chemical synthesis.

FIG. 10 shows TEM images of the Al@Cu$_2$O particles formed by the chemical synthesis. In (a) a TEM image of as synthesized Al NCs, while (b) shows a TEM image after the growth of the Cu$_2$O shell around the Al core. In both (a) and (b) the scale bar is 50 nm. In (c) a HRTEM image is shown depicting the Al@Cu$_2$O showing more clearly the Al core, the thin amorphous Al$_2$O$_3$ oxide layer, and the surrounding Cu$_2$O shell.

Figure 11:
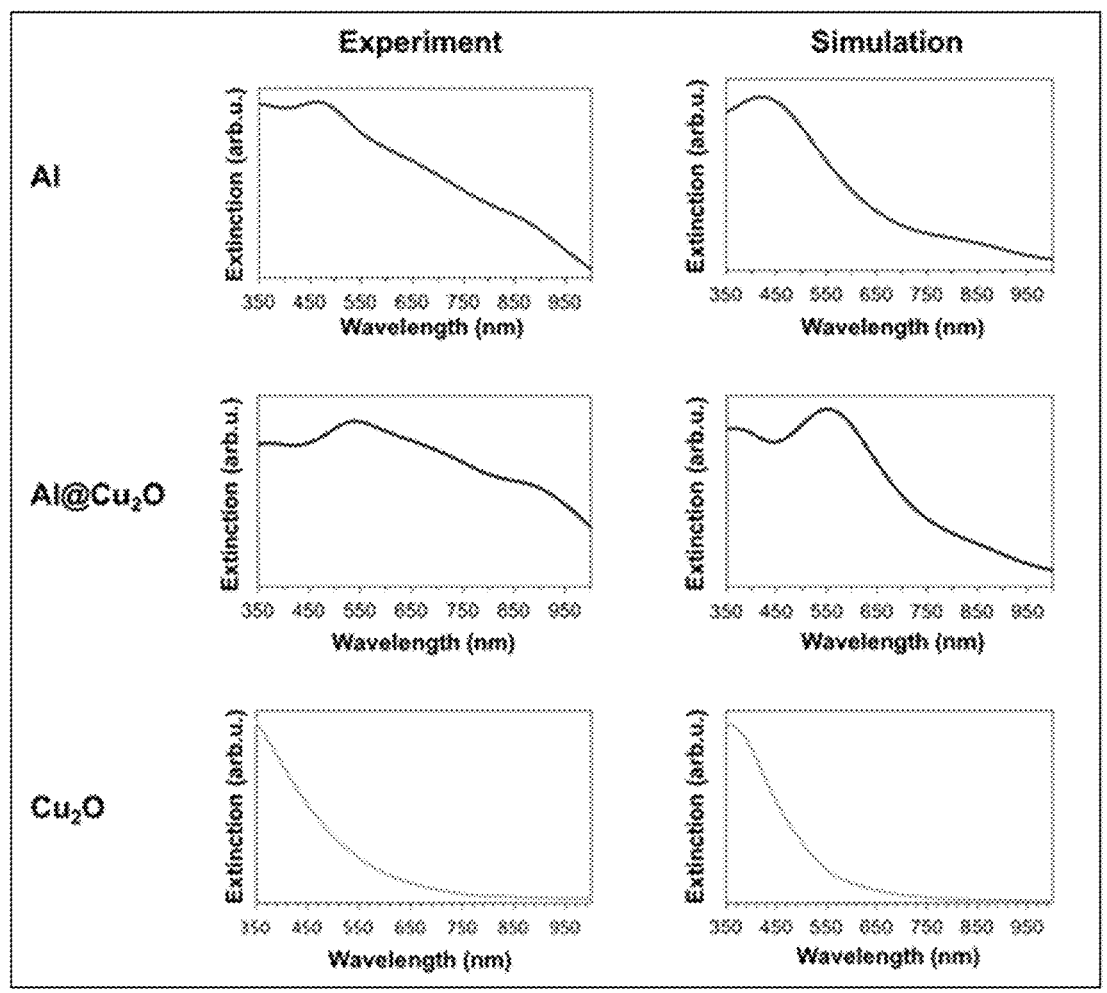
FIG. 11 shows plots showing results for the optical characterization of Al NCs, Al@$Cu_2O$, and $Cu_2O$.

FIG. 11 shows results for the optical characterization of Al NCs, Al@Cu$_2$O, and Cu$_2$O. More specifically, FIG. 11 shows experimental (left) and theoretical (right) UV-Vis extinction spectra of Al NCs, Al@Cu$_2$O, and Cu$_2$O in IPA. Pristine Al NCs show a dipolar LSPR around 460 nm that redshifts to around 550 nm after growth of the Cu$_2$O shell (typical thickness of the is about 15-20 nm) due to real part of the Cu$_2$O permittivity.

The photocatalysts used in this study were prepared from a homogeneous dispersion of plasmonic particles dispersed on a high surface area γ-Al$_2$O$_3$ support at 5 wt %. Photocatalytic measurements were performed using about 20 mg of this sample mixture, loaded into a customized stainless steel chamber with a quartz window to allow for illumination (Harrick Scientific Product Inc.) that mimics continuous flow packed-bed reactor conditions. High purity $H_2$ and $CO_2$ at a total pressure of 1 atm and a total flow of 10 standard cubic centimeters per minute (sccm) were flowed continuously into the chamber. The chamber outlet was connected to a gas chromatograph (Shimadzu Inc.). A supercontinuum fiber laser (Fianium, 450-850 nm, 4 ps, 40 MHz) and a tunable Ti:sapphire laser (Coherent, Chameleon Ultra II, 150 fs, 80 MHz, bandwidth ~10 nm) were used as light sources.

Figure 12:
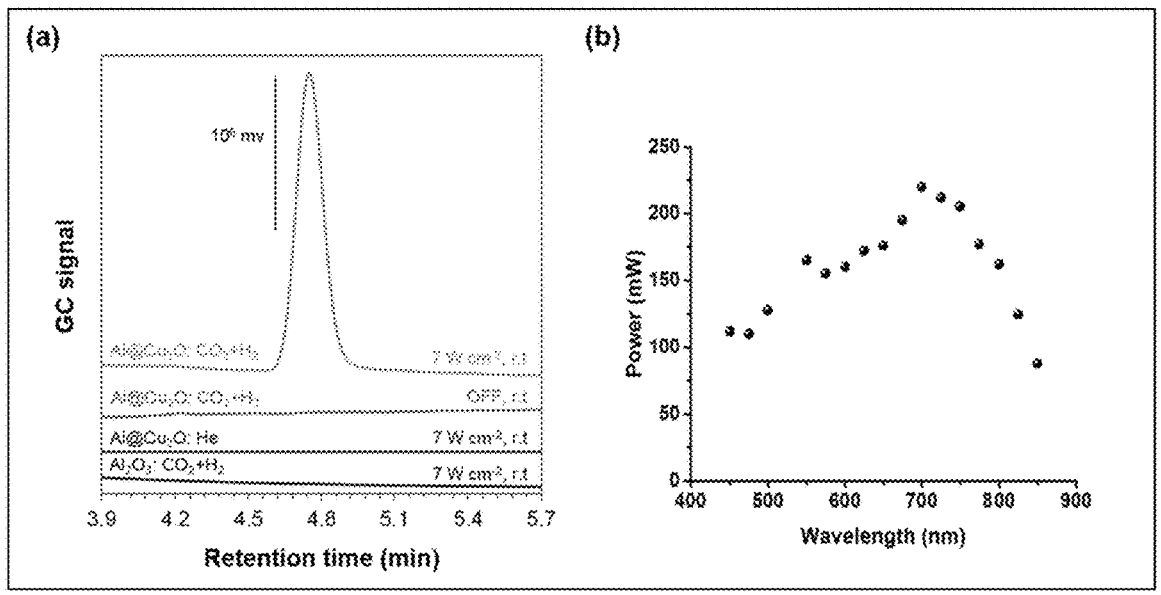
FIG. 12 shows (a) gas chromatogram results of photocatalytic $CO_2$ hydrogenation experiments, via the reverse water-gas shift reaction (rWGS) and (b) the spectrum of the light source used for illumination.

FIG. 12 shows gas chromatogram results (a) of photocatalytic $CO_2$ hydrogenation experiments, via the reverse water-gas shift reaction (rWGS), performed in $CO_2$ and $H_2$ at a 1:1 ratio and a total flow rate of 10 sccm and also separately in He (10 sccm) atmospheres under visible light illumination. The spectrum of the light source used for illumination is shown in (b). CO formation was detected when $CO_2$ and $H_2$ were both present, upon illumination of the Al@Cu$_2$O multicomponent photocatalyst/γ-Al$_2$O$_3$ mixture. Illumination of the photocatalyst in an inert He atmosphere did not produce any measurable product, verifying CO formation was not from the degradation of the oleic acid capping agent. Also, there was no measurable product in pure γ-Al$_2$O$_3$ in the absence of the multicomponent photocatalyst, verifying that the Al@Cu$_2$O plasmonic photocatalyst was the active component.

Figure 13:
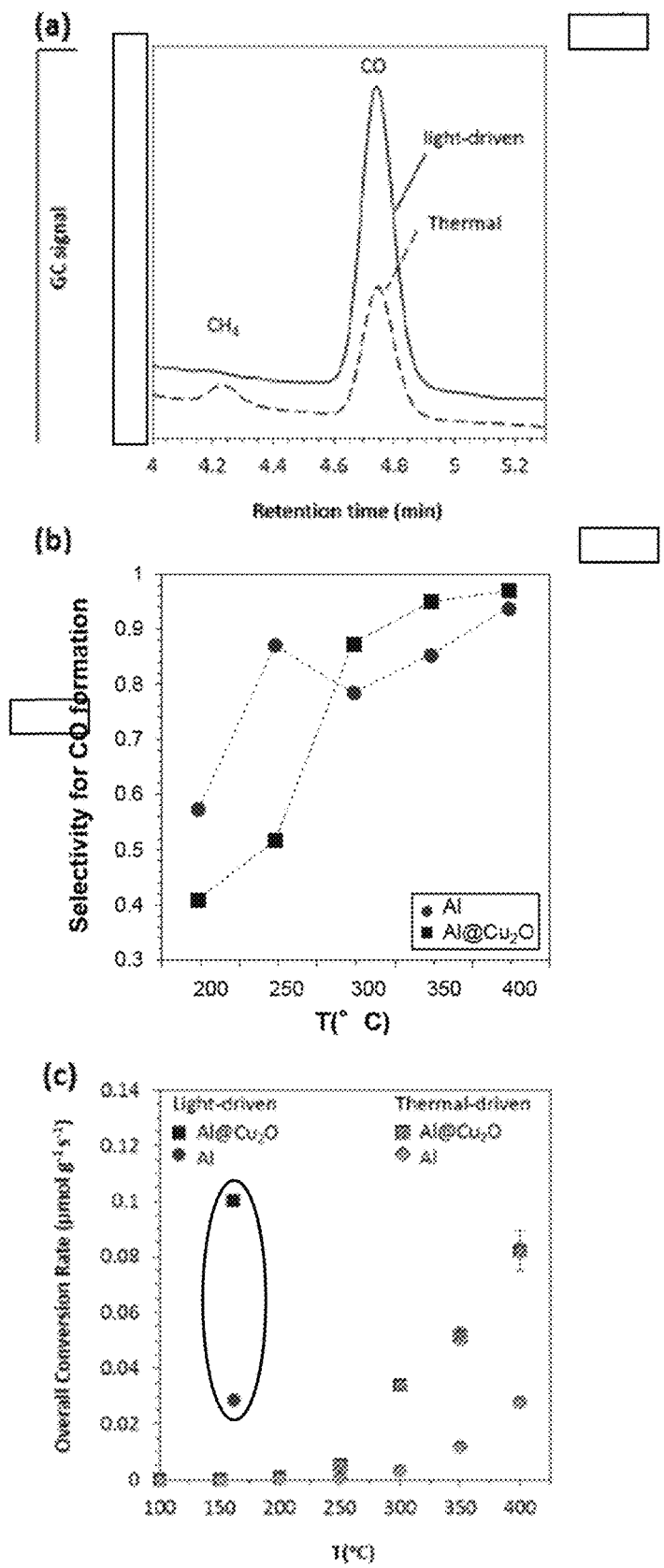
FIG. 13 shows plots of the photocatalytic activity versus thermal-driven activity for the rWGS reaction using the Al@$Cu_2O$ multicomponent photocatalysts and pristine Al.

FIG. 13 shows plots of the photocatalytic versus thermal-driven activity characterization for the rWGS reaction using the Al@Cu$_2$O. In (a) gas chromatogram of the reaction products output from the reaction chamber during light-induced (illuminated with 7 W/cm²) and purely thermally driven (heated to 350° C.) rWGS is shown. Prior to the reactions using illumination, the multicomponent photocatalyst and stainless steel stage are in thermal equilibrium with room temperature. Upon, illumination with 7 W/cm² visible light, the temperature of pure oxide support reaches up to 55° C., while after loading plasmonic nanoparticles into the oxide support, the temperature rises up to slightly above 150° C. under the same light intensity.

The results shown in (a) show that in contrast to the highly selective CO formation observed for the photocatalytic process, the thermally driven rWGS reaction (when the photocatalyst is used without external illumination) results in the formation of both CH$_4$ and CO. In (b) the selectivity for CO formation over CH$_4$ formation as a function of temperature is shown for Al@Cu$_2$O during thermally driven rWGS (i.e., no illumination). At 200° C., very low selectivity of about 40 and 55% were obtained on Al@Cu$_2$O. As the temperature increased, the selectivity of CO over CH$_4$ increases, as formation of CH$_4$ is an exothermic reaction. The selectivity of CO/CH$_4$ formation reaches up to 97% at 400° C. However, even at this high of a temperature the CO formation selectivity in the thermal process is still less than that of 100/selectivity obtained (see, the results in FIG. 13(a)) from plasmon-induced process at lower operating conditions. In (c) the overall rate of product formation on Al/γ-Al$_2$O$_3$ and Al@Cu$_2$O/γ-Al$_2$O$_3$ as a function applied temperature in the purely thermal process (no illumination). Also in (c), the reaction rate during the light-induced process (illumination using 10 W/cm$^2$) on Al/γ-Al$_2$O$_3$ and Al@Cu$_2$O/γ-Al$_2$O$_3$ are shown as the two data points encircled in the ellipsoid at the corresponding recorded temperature of about 160-170° C.

The results in (c) show that a photothermal effect does not play a major role in CO formation because, as shown, the onset temperature of product formation in a purely thermal process is around 200° C. Indeed, the overall reaction yield at an illumination intensity of 10 W/cm$^2$ is comparable to the thermal process at temperatures of 400° C. Thus, the results in (c) provides additional evidence that plasmon-induced chemical transformations can operate more efficiently and selectively under milder reaction conditions.

Figure 14:
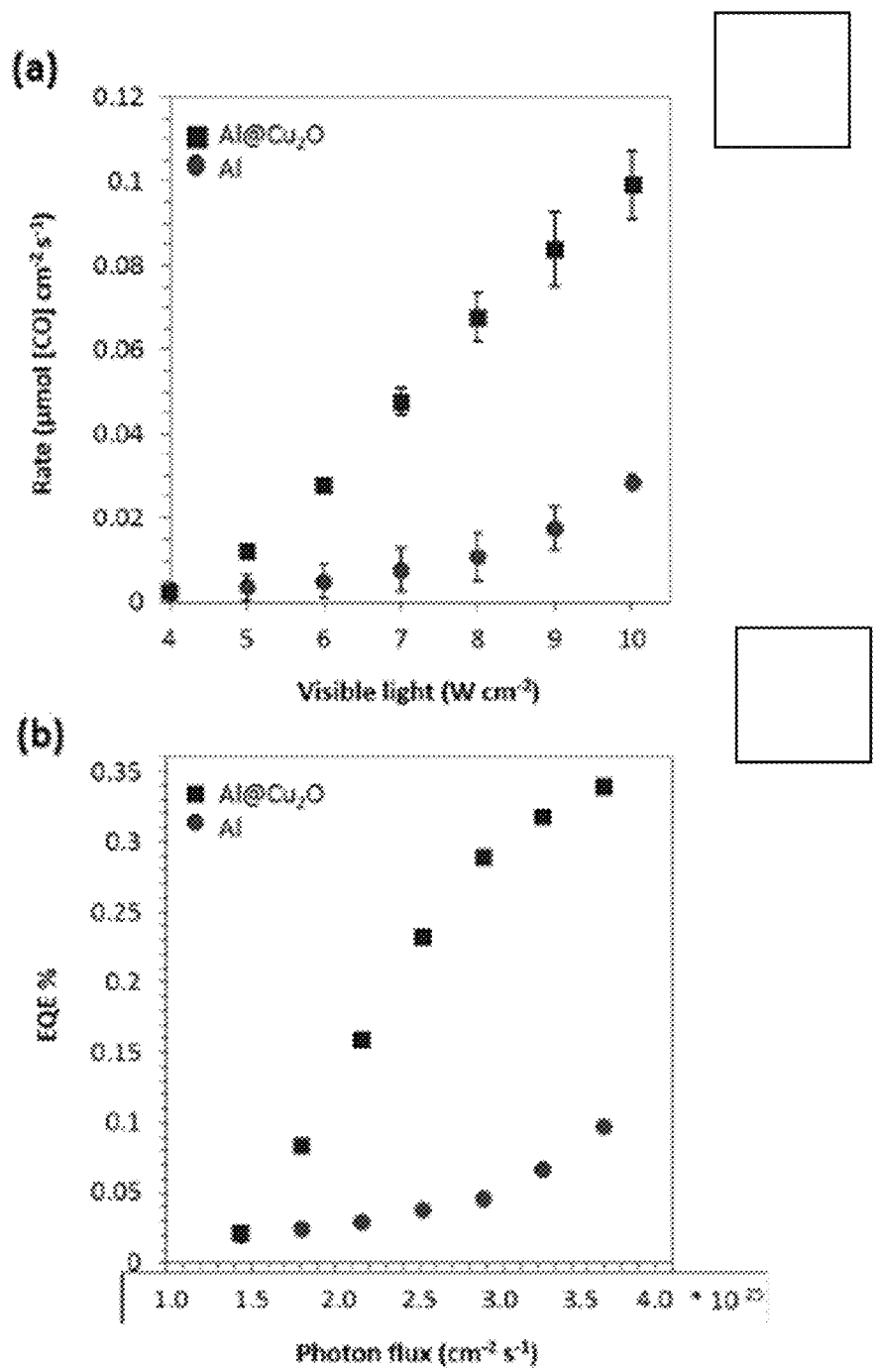
FIG. 14 shows (a) the rate of CO formation as a function of visible-light intensity under ambient conditions and (b) the external quantum efficiency (EQE) as a function of photon flux when using the Al@$Cu_2O$ multicomponent photocatalyst or pristine Al.

FIG. 14 shows (a) the rate of CO formation as a function of visible-light intensity under ambient conditions and (b) the external quantum efficiency (EQE) as a function of photon flux. The rate of CO formation catalyzed by Al@Cu$_2$O is significantly higher than that of pristine Al without the reactive Cu$_2$O shell, particularly at higher illumination intensities. Similarly, the Al@Cu$_2$O heterostructures exhibit higher EQE. The positive dependence of EQE to incident photon flux observed for both systems is a distinct feature of plasmon-induced charge-carrier driven photocatalysis. On the contrary, it is known that increasing irradiation intensities does not improve EQE on semiconductor surfaces. In conventional semiconductor photocatalysis, reaction rate is proportional to intensity$^n$, with n<1, whereas for plasmon-induced photocatalysis by hot carriers n>1. 'N' is a descriptor that is calculated from experimental power dependence measurements and it describes the relationship between photon input and the reaction rate. Higher 'n' means that there is a higher efficiency on a photon-by-photon basis. For example, in (b), n was calculated to be ~2.65 and 3.78 on Al and Al@Cu$_2$O, respectively.

Figure 15:
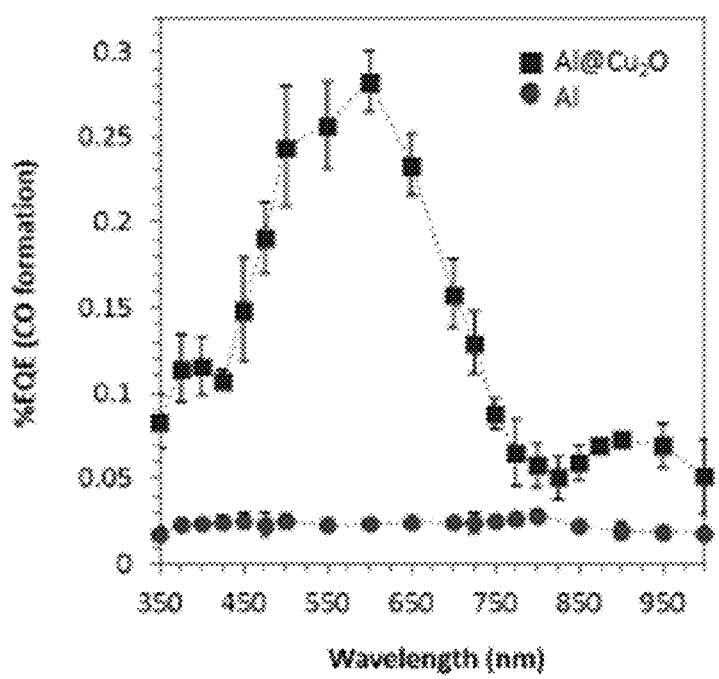
FIG. 15 shows a plot of the measured EQE for Al@$Cu_2O$ and pristine Al versus illumination wavelength.

FIG. 15 shows a plot of the measured EQE for Al@Cu$_2$O and pristine Al versus illumination wavelength. It was found that coating Al with a Cu$_2$O shell substantially enhanced the EQE. This catalytic enhancement is particularly pronounced around the dipolar plasmon resonance of Al@Cu$_2$O at ~570 nm, thus supporting a plasmon-enhanced carrier generation mechanism for driving rWGS.

Example 3—Synthesis and Testing of Cu—Ru Surface Alloy@Cu Supported Catalyst

Cu—Ru surface alloy@Cu supported on MgO—Al$_2$O$_3$ (19.5 at % Cu & 0.5 at % Ru):

0.707 g (2.925 mmol) Cu(NO$_3$)$_2$.3H$_2$O (Sigma-Aldrich®, #61194), 0.0190 g (~0.075 mmol) RuCl$_3$.xH$_2$O (Acros organics, #A0324917), 2.308 g (9 mmol) Mg(NO$_3$)$_2$.6H$_2$O (Sigma-Aldrich®, #63084) and 1.125 g (3 mmol) Al(NO$_3$)$_2$.9H$_2$O (Sigma-Aldrich®, #237973) were dissolved in 15 mL DI water (Milli-Q® Advantage A10) to make the metal precursor solution. A second, basic solution was prepared by dissolving 2.544 g (24 mmol) anhydrous Na$_2$CO$_3$ (J.T.Baker®, #3602-01) in 20 mL DI water.

10 mL of DI water was added to a 100 mL 5-neck, round-bottom flask and heated to 80° C. The metal precursor solution and Na$_2$CO$_3$ solution were added simultaneously and in a dropwise fashion to the preheated water. The pH was monitored with a pH meter (Accumet®, Portable, AP63) and kept at ~pH=8 by varying the speed of addition both solutions, which was carried out over 15 minutes. The resulting solid slurry was allowed to stir at 80° C. for 24 hours before cooling to room temperature. The catalyst precursor was isolated by centrifuging the slurry at ~100 g and subsequently washed 4 times with DI water and dried in the air at 120° C. overnight.

Figure 19:
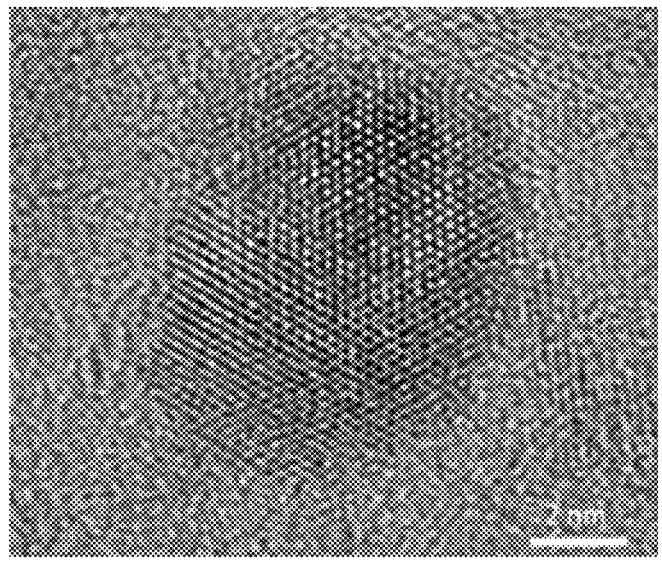
FIG. 19 shows a high-resolution transmission electron micrograph (TEM) of a single Cu—Ru surface alloy particle according to an embodiment of the application.
Figure 20:
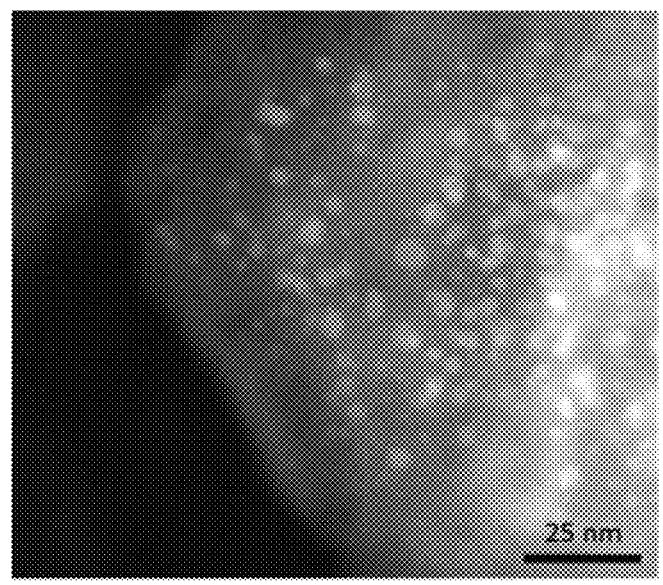
FIG. 20 shows a high-angle annular dark-field (HAADF) image of the reduced Cu—Ru surface alloy (lighter contrast areas) supported on the MgO—$Al_2O_3$ support according to an embodiment of the application.
Figure 21:
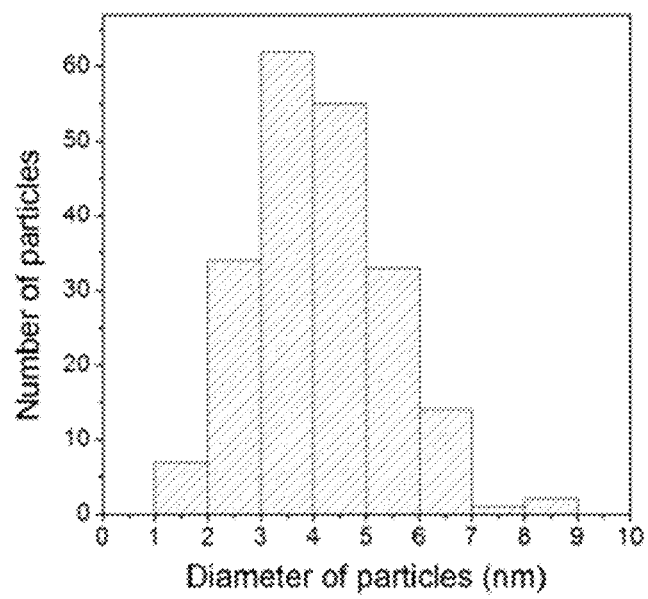
FIG. 21 shows a plot of the size distribution of the reduced Cu—Ru surface alloy of Example 3.

To activate the catalyst prior to any measurements, the dry precursor was packed into the high-temperature reaction chamber (Harrick Scientific Products Inc., #HVC-VUV-5, quartz window) within a 2 mm-inner diameter stainless steel sample ring to get a thick, cylindrical sample pellet. After purging the chamber with 200 sccm (standard cubic centimeter per min, at 70° F. and 1 Bar) He for 10 mins to expel excess air, the precursor was annealed at 500° C. with a ramp rate of 10° C./min and held for 1 h in 20 sccm He (Airgas, ultrahigh purity, 99.999%). Then, the gas was switched to 10 sccm H$_2$ (Airgas, research purity, 99.9999%) to reduce the sample at 500° C. for one hour. FIG. 19 shows a high-resolution transmission electron micrograph (TEM) of a single Cu—Ru surface alloy particle resulting from the reducing process described above. FIG. 20 shows a high-angle annular dark-field (HAADF) image of the reduced Cu—Ru surface alloy (lighter contrast areas) supported on the MgO—Al$_2$O$_3$ support. FIG. 21 shows a plot of the size distribution of the reduced Cu—Ru surface alloy. For thermocatalysis experiments, precursor was packed into the chamber without using a sample ring to get a thin sample pellet so that the temperature of the whole sample was uniform.

Figure 22:
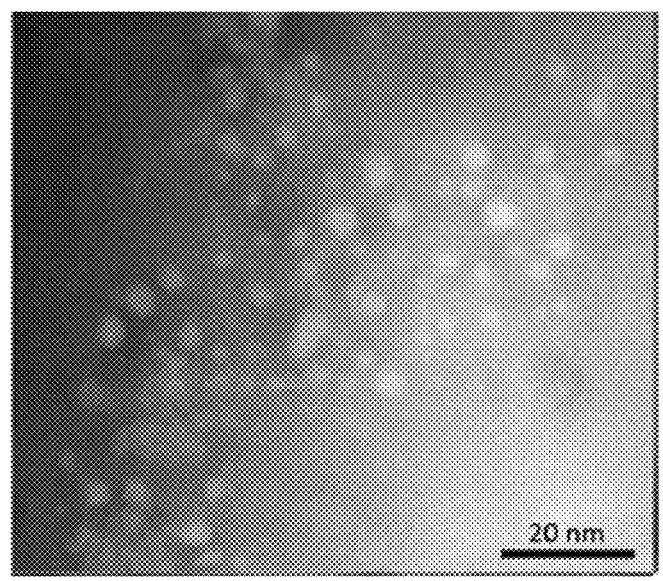
FIG. 22 shows a HAADF image of the reduced Cu nanoparticles (lighter contrast areas) supported on the MgO—$Al_2O_3$ support according to an embodiment of the application.
Figure 23:
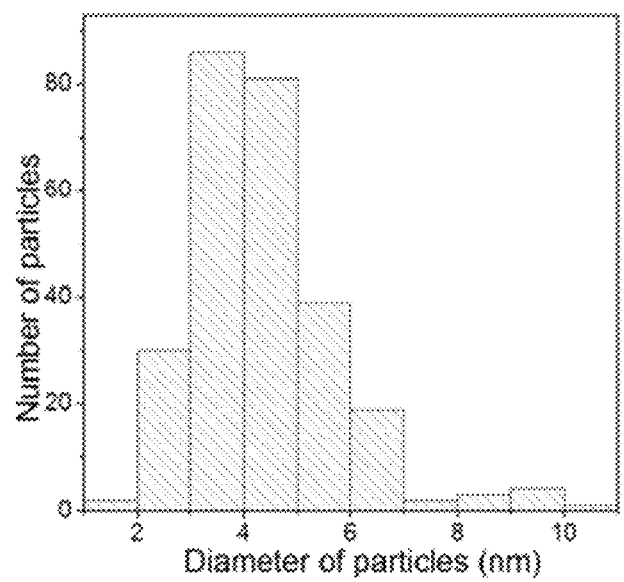
FIG. 23 shows a plot of the size distribution of the reduced Cu nanoparticles of Example 3.

Cu Nanoparticles Supported on MgO—Al$_2$O$_3$ (20 at % Cu):

The preparation and treatment procedure was the same as above for the Cu—Ru surface alloy, but the metal precursor solution was prepared by dissolving 0.725 g (3 mmol) Cu(NO$_3$)$_2$.3H$_2$O, 2.308 g (9 mmol) Mg(NO$_3$)$_2$.6H$_2$O and 1.125 g (3 mmol) Al(NO$_3$)$_2$.9H$_2$O in 15 mL DI water. FIG. 22 shows a HAADF image of the reduced Cu nanoparticles (lighter contrast areas) supported on the MgO—Al$_2$O$_3$ support. FIG. 23 shows a plot of the size distribution of the reduced Cu nanoparticles.

Figure 24:
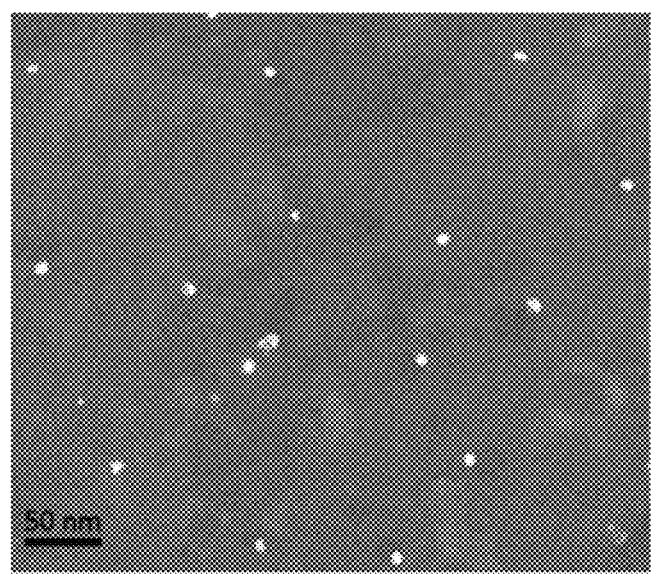
FIG. 24 shows a HAADF image of the reduced Ru nanoparticles (lighter contrast areas) supported on the MgO—$Al_2O_3$ support according to an embodiment of the application.
Figure 25:
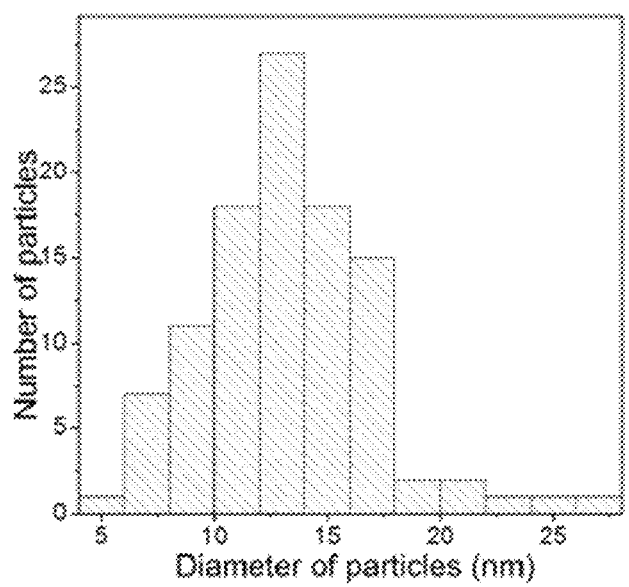
FIG. 25 shows a plot of the size distribution of the reduced Ru nanoparticles of Example 3.

Ru Nanoparticles Supported on MgO—Al$_2$O$_3$ (0.5 at % Ru):

0.0190 g (0.075 mmol) RuCl$_3$.xH$_2$O, 2.870 g (11.19 mmol) Mg(NO$_3$)$_2$.6H$_2$O and 1.399 g (3.73 mmol) Al(NO$_3$)$_2$.9H$_2$O were dissolved in 15 mL DI water to make the metal ion mixed solution. The preparation and treatment procedure was the same as for Cu—Ru surface alloy sample. FIG. 24 shows a HAADF image of the reduced Ru nanoparticles (lighter contrast areas) supported on the MgO—Al$_2$O$_3$ support. FIG. 25 shows a plot of the size distribution of the reduced Ru nanoparticles.

Figures 33, 34:
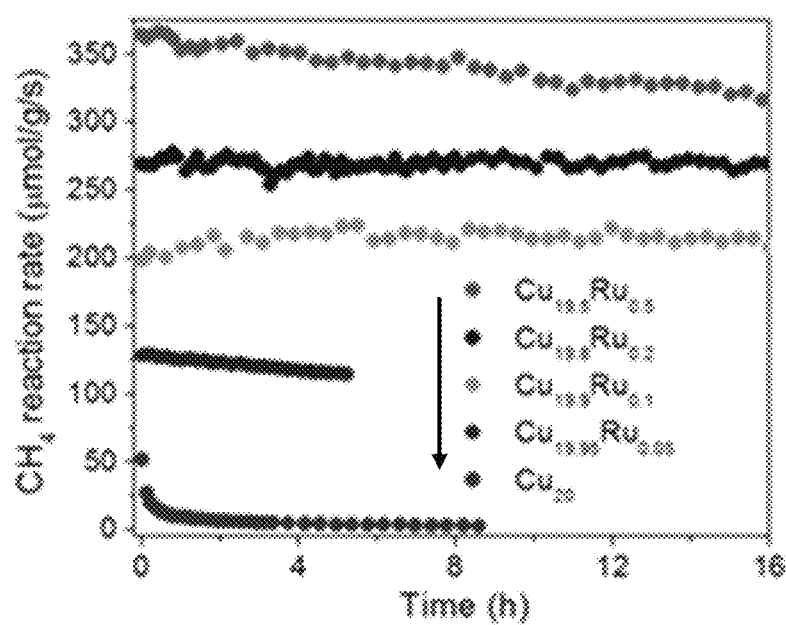
FIG. 33 is a table showing the element concentration in the coprecipitated precursor (i.e., before the activation process) as measured by inductively coupled plasma (ICP) spectroscopy.
FIG. 34 shows the reaction rate and long-term stability during photocatalytic dry methane reforming reaction under 19 W/cm² white light illumination.

FIG. 33 is a table showing the element concentration in the coprecipitated precursor (i.e., before the activation process) as measured by inductively coupled plasma (ICP) spectroscopy.

Figure 26:
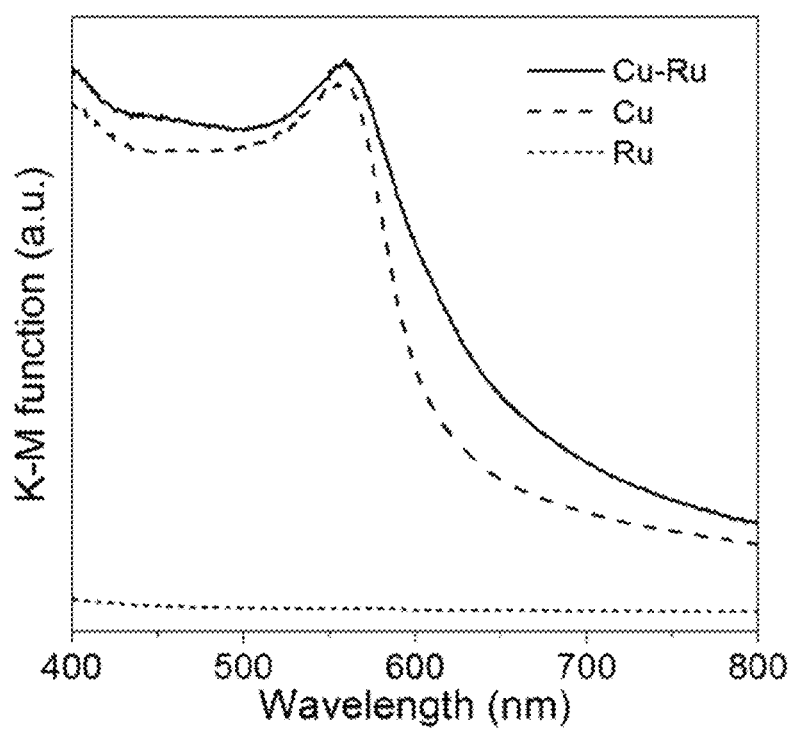
FIG. 26 shows UV-Vis diffuse reflectance spectra of Cu—Ru surface alloy (solid line), Cu nanoparticles (dashed line) and Ru nanoparticles (short-dashed line).

FIG. 26 shows UV-Vis diffuse reflectance spectra of Cu—Ru surface alloy (solid line), Cu nanoparticles (dashed line) and Ru nanoparticles (short-dashed line). Vertical axis is the Kubelka-Munk function.

Figure 27:
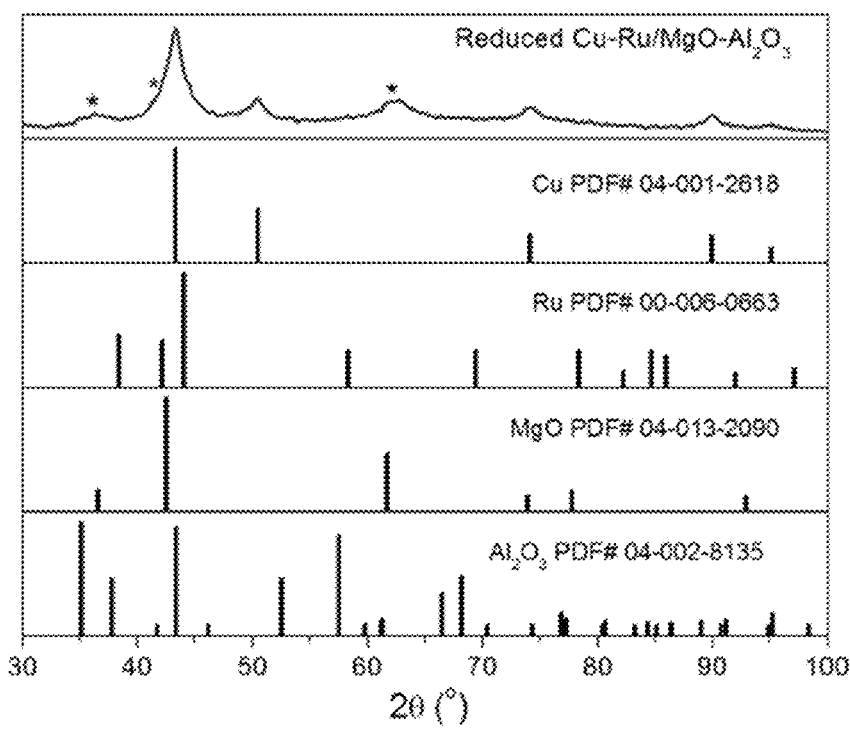
FIG. 27 shows powder X-ray diffraction (PXRD) of Cu—Ru surface alloy on MgO—$Al_2O_3$ support and XRD data of Cu, Ru, MgO and $Al_2O_3$ from International Centre for Diffraction Data (ICDD) cards.

FIG. 27 shows powder X-ray diffraction (PXRD) of Cu—Ru surface alloy on MgO—Al$_2$O$_3$ support and XRD data of Cu, Ru, MgO and Al$_2$O$_3$ from International Centre for Diffraction Data (ICDD) cards. The diffraction pattern shows five peaks corresponding to metallic copper and three peaks/shoulder (labeled with *) matching with (111), (200), (220) of MgO. No peak corresponding to crystalline Al$_2$O$_3$ is found, indicating its amorphous structure. There is no peak corresponding to Ru either because of the low loading of Ru.

Figure 28:
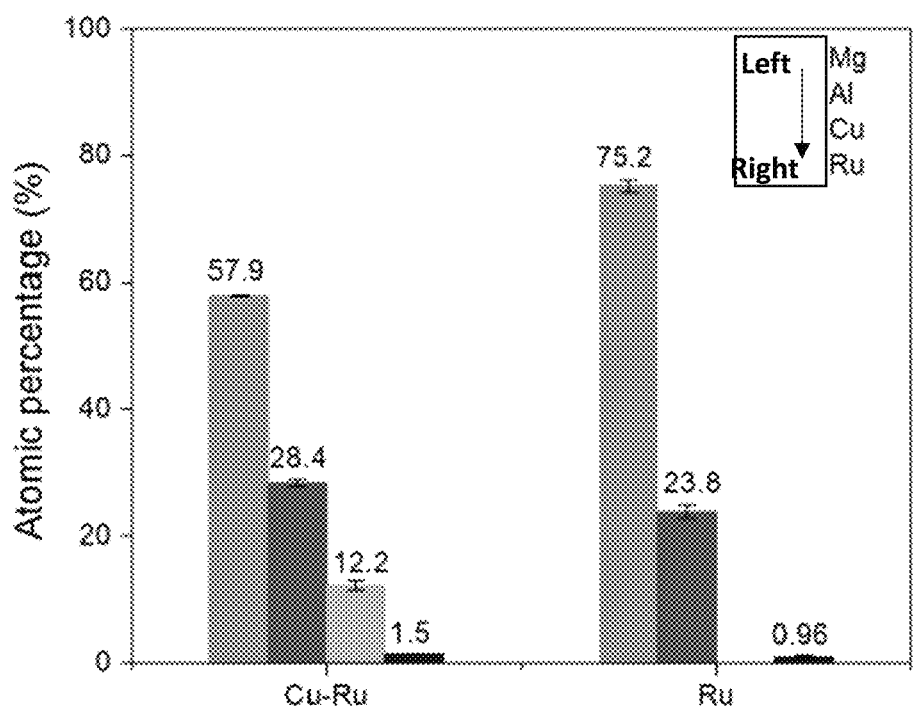
FIG. 28 shows X-ray photoelectron spectroscopy (XPS) result of Cu—Ru surface alloy supported on MgO—$Al_2O_3$ and Ru nanoparticles supported on MgO—$Al_2O_3$.

FIG. 28 shows X-ray photoelectron spectroscopy (XPS) result of Cu—Ru surface alloy supported on MgO—Al$_2$O$_3$ and Ru nanoparticles supported on MgO—Al$_2$O$_3$. Higher surface atomic percentage of ruthenium in Cu—Ru surface alloy supports the surface alloy structure by showing a surface enriched in Ru.

Figure 29:
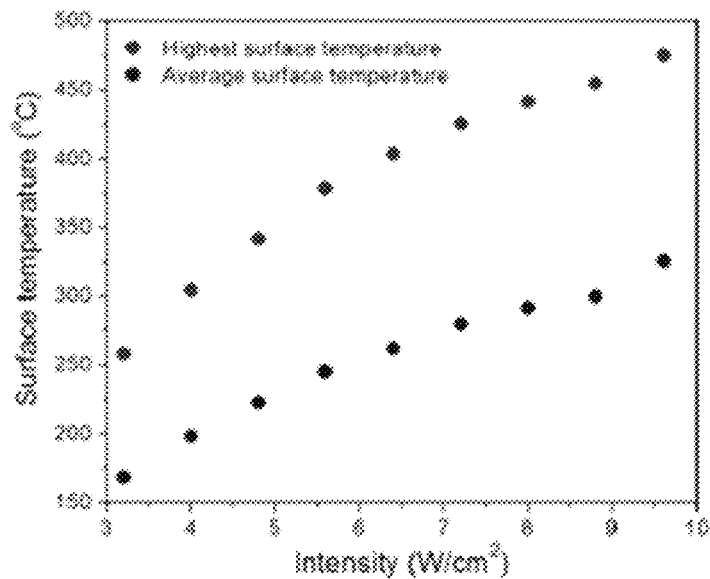
FIG. 29 shows a plot of highest surface temperatures and average surface temperatures of a sample pellet of the Cu—Ru surface alloy supported on MgO—$Al_2O_3$ under white light illumination as a function of light intensity.

FIG. 29 shows a plot of highest surface temperatures and average surface temperatures of a sample pellet of the Cu—Ru surface alloy supported on MgO—Al$_2$O$_3$ under white light illumination as a function of light intensity. The reactor temperature was kept at room temperature for the data presented in FIG. 29.

Catalysis experiments—Ammonia Decomposition (2NH$_3 \rightarrow$N$_2$+3H$_2$)

Photocatalysis reactions were carried out in fixed-bed, continuum-flow reactor (Harrick Scientific Products, Inc., #HVC-VUV-5). White light from a supercontinuum laser (Fianium, WL-SC-400-8, 400-900 nm, 4 ps, 80 MHz) was focused by an achromatic lens with a 100 mm focal length (Thorlab, AC254-100-A-ML) resulting in an 2 mm diameter beam profile on the catalyst surface. The temperature of the chamber was maintained at 27° C. unless otherwise noted. The feed gas was pure NH$_3$ (Airgas, anhydrous purity, 99.99%). Gas flow rates were controlled with mass flow controllers (Alicat Scientific). The flow rates were optimized for different experiments based on two criteria: (i) high enough to make the conversion below 2% to achieve differential reactor conditions according to a flow-rate-dependence experiment; (ii) as low as possible while maintaining high signal to noise ratios. All the catalytic reactions were operated under atmospheric pressure. The effluent composition was monitored by an online quadruple mass spectrometer (MS) (Hiden Analytical Inc., QIC-20) at m/e=2 (H$_2$), 28 (N$_2$) and 17 (NH$_3$) in real time or an online gas chromatography (GC) (Shidmazu-2014) equipped with a pulsed discharge helium ionization detector (PDHID) and a molecular sieve 13X (MS-13X) packed column. MS can detect both of reactant (NH$_3$) and products (N$_2$ & H$_2$) while GC can only detect products with the column we used. But GC gives better signal to noise ratios.

Reaction rates were quantified based on linear calibration curves of pure H$_2$ and N$_2$ for both MS and GC. As the conversion is controlled below 2%, the increase of total volume flow due to reaction stoichiometry (2NH$_3$ converted to 3H$_2$ and 1N$_2$) is negligible. The reaction rate was calculated according to the following equation:

$$r_{abs}(\mu mol \cdot s-1) = \Delta p(\%) \cdot f(sccm) 60 (s \cdot min^{-1}) \cdot 22400 \ (ml \cdot mol^{-1}) \cdot 106(\mu mol \cdot mol^{-1})$$

where $\Delta p$ is the percentage change of a reactant or product in the flow while f is the flow rate of feeding NH$_3$ The specific reaction rate is calculated based on the mass of precursor:

$$r_0(\mu mol \cdot g^{-1} \cdot s^{-1}) = r_{abs}(\mu mol \cdot s^{-1}) m_{precursor}(g)$$

The turnover frequency (TOF) is calculated based on the following formula:

$$TOF_R(h^{-1}) = r_{abs}(\mu mol \cdot s^{-1})/n_{Ru}(\mu mol) \cdot 3600(s \cdot h^{-1})$$

where $n_{Ru}$ is the moles of ruthenium in the catalyst, which is obtained from ICP-MS measurement.

Figure 16:
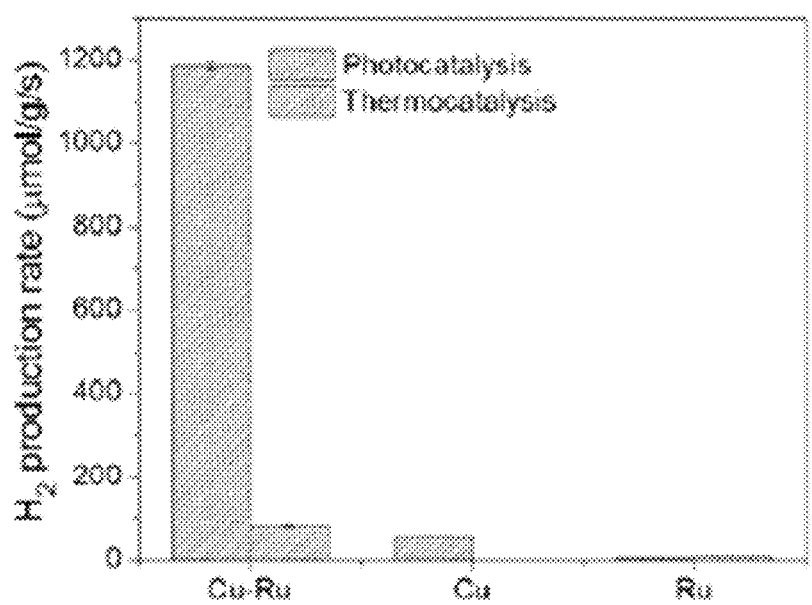
FIG. 16 shows a plot of the $H_2$ production rate during photocatalysis (9.6 W/cm² white light illumination) and thermocatalysis (at 482° C.) for the various catalysts.

FIG. 16 shows a plot of the H$_2$ production rate during photocatalysis (9.6 W/cm$^2$ white light illumination) and thermocatalysis (at 482° C.) for the various catalysts. The left column for each catalyst represents the photocatalysis results, while the thermocatalysis results are shown in the right column. Compared to monometallic Cu and Ru nanoparticles, the photocatalytic reaction rate on the Cu—Ru surface alloy@Cu supported on MgO—Al$_2$O$_3$ catalyst was ~20 and ~177 times higher, respectively. For illumination at 9.6 W/cm$^2$, without external heating, the photocatalytic reaction rate of Cu—Ru surface alloy@Cu supported on MgO—Al$_2$O$_3$ can reach as high as 1.2 mmol H$_2$/g/s. The reaction rate dropped to zero when light was turned off. The turnover frequency (TOF) based on Ru loading was >15 s$^{-1}$ and the energy efficiency (the reaction is endothermic with $\Delta H°_{rxn}$ of 46 kJ/mol) was calculated to be ~18% from:

$$\eta_{energy} = \frac{\text{reaction rate (mol/s)} | \text{reaction enthalpy (J/mol)}}{\text{optical power (J/s)}} * 100\%$$

Figure 17:
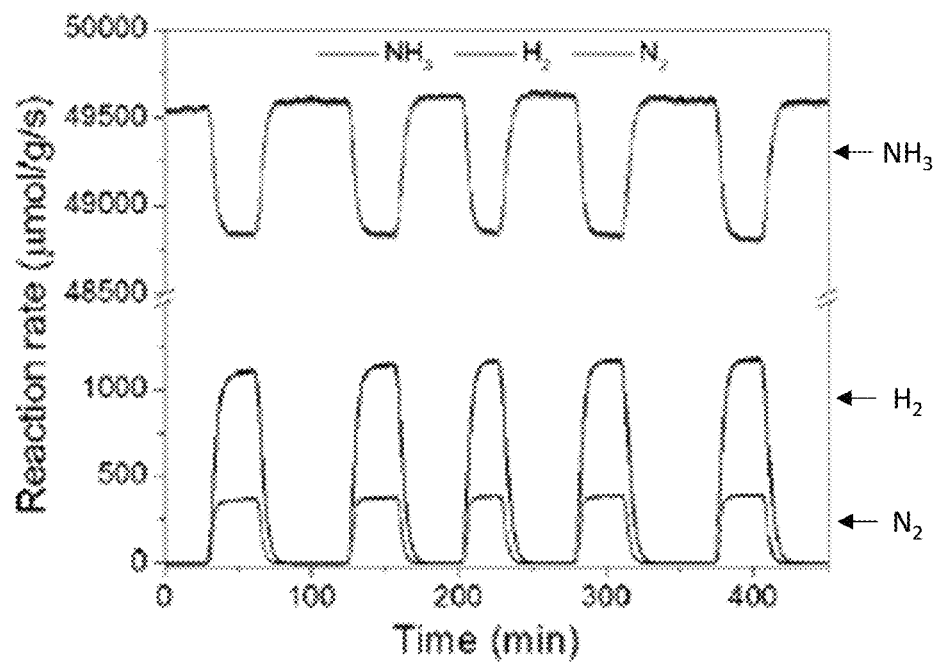
FIG. 17 show a plot demonstrating the reaction rate during multiple hour long measurement of photocatalytic rates using the Cu—Ru surface alloy@Cu supported on MgO—$Al_2O_3$ catalyst under 9.6 W/cm² white light illumination without external heating.

FIG. 17 show a plot demonstrating the reaction rate during multiple hour long measurement of photocatalytic rates using the Cu—Ru surface alloy@Cu supported on MgO—Al$_2$O$_3$ catalyst under 9.6 W/cm$^2$ white light illumination without external heating. The ratio of photocatalytic reaction rates based on the measured amounts of NH$_3$, N$_2$ and H$_2$ are consistent with the stoichiometry of the reaction, confirming the absence of unintended side reactions.

Figure 18:
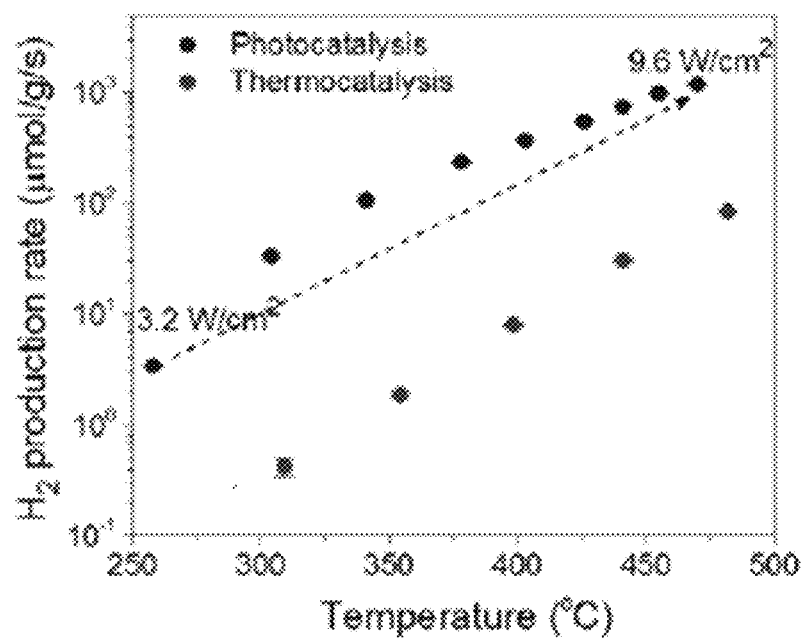
FIG. 18 shows a plot comparing the photocatalytic and thermocatalytic rates using the Cu—Ru surface alloy@Cu supported on MgO—$Al_2O_3$ catalyst.

FIG. 18 shows a comparison of photocatalytic and thermocatalytic rates using the Cu—Ru surface alloy@Cu supported on MgO—Al$_2$O$_3$ catalyst. The horizontal axis corresponds to the surface temperature of the catalyst due to photothermal heating in the upper set of measurements (photocatalysis) or external heating in the lower set of measurements (thermocatalysis). The light intensity differences between successive data points are 0.8 W/cm$^2$. FIG. 18 shows that when ammonia decomposition was performed without illumination, but with external heating at temperatures equivalent to those achieved under illumination, the thermocatalytic rates of H$_2$ production were 1-2 orders of magnitude below the observed photocatalytic rates.

Figure 30:
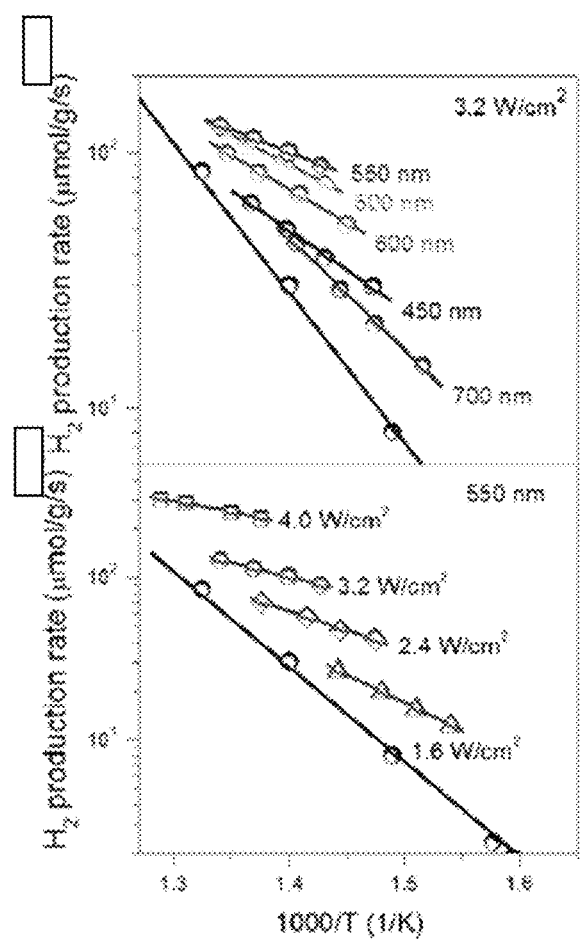
FIG. 30 shows two Arrhenius plots of apparent activation barriers for different wavelengths (upper plot) under constant intensity of 3.2 W/cm² and in the dark (trend line not marked by a wavelength) and (lower plot) for different light intensities at 550 nm and in the dark (trend line not marked by a wavelength).

FIG. 30 shows two Arrhenius plots of apparent activation barriers for different wavelengths (upper plot) under constant intensity of 3.2 W/cm$^2$ and in the dark (trend line not marked by a wavelength) and (lower plot) for different light intensities at 550 nm and in the dark (trend line not marked by a wavelength).

Figures 31, 32:
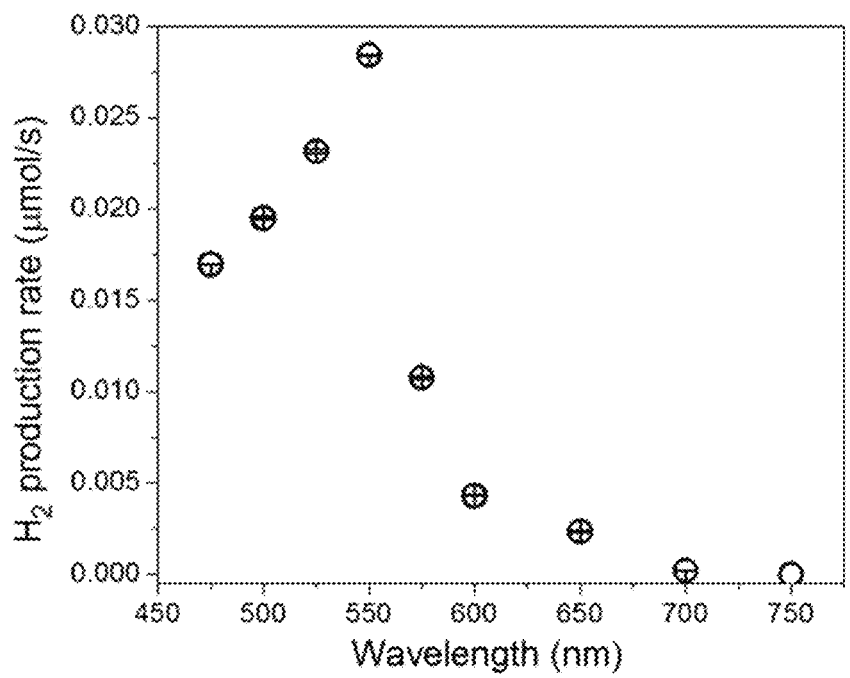
FIG. 31 shows the wavelength dependence of photocatalytic reaction rate on Cu—Ru surface alloy@Cu supported on MgO—$Al_2O_3$.
FIG. 32 shows the apparent activation barriers (eV) under various illumination conditions for the Cu—Ru surface alloy@Cu supported on MgO—$Al_2O_3$.

FIG. 31 shows the wavelength dependence of photocatalytic reaction rate on Cu—Ru surface alloy@Cu supported on MgO—Al$_2$O$_3$. Feeding rate of NH$_3$ was 5 sccm and 1.5 mg photocatalyst was used.

FIG. 32 shows the apparent activation barriers (eV) under various illumination conditions for the Cu—Ru surface alloy@Cu supported on MgO—Al$_2$O$_3$.

In the plasmonic photocatalytic decomposition of ammonia, the apparent activation barrier depends strongly on both incident wavelength and light intensity. This dependence can be accounted for by hot carrier-induced associative desorption of N$_2$, which simultaneously reduces the coverage of reaction intermediates, significantly decreasing the apparent activation barrier. A knowledge of the light-dependent activation barrier can be used to quantitatively predict photocatalytic reaction rates for given reaction conditions, such as illumination and external heating. The predictive and quantitative methodology presented here paves the way for optimization of plasmonic photocatalysis for energy efficient applications.

Catalysis Experiments—Methane Dry Reforming ($CH_4 + CO_2 \rightarrow 2CO + 2H_2$)

Cu—Ru surface alloy@Cu supported on MgO—$Al_2O_3$ and Cu supported on MgO—$Al_2O_3$ catalysts were prepared by a coprecipitation method as described above. The photocatalysts were denoted as $Cu_xRu_y$, with x and y referring to the respective atomic percentage of Cu and Ru elements in total metal elements (Cu, Ru, Mg and Al) of the catalyst. All surface alloy photocatalyst samples fabricated exhibit similar size distributions, with an average diameter of the Cu—Ru surface alloy particles of ~5 nm. From XPS it can be observed that the binding energy of Ru 3p shifts to a higher value compared to metallic Ru, an indication of electron transfer from Ru to Cu. Also, the surface atomic ratio of Ru/Cu is higher than the bulk atomic ratio determined from ICP-MS, suggesting the enrichment of Ru on the surface. For $Cu_{20}$ nanoparticles synthesized without Ru, the concentration of surface Cu was 94.8 µmol/g, measured by $N_2O$ chemisorption, while for surface alloy nanoparticles the concentration of surface Cu decreased with increasing additions of Ru in the synthesis, supporting the realization of formation of a Ru—Cu surface alloy. In addition, samples with Ru loading below 0.2 at % have a Ru surface coverage <20% according to $N_2O$ chemisorption, lower than the maximum allowable surface coverage for atomic dispersion on a close-packed surface. UV-Vis diffuse reflectance spectra show a resonant peak at ~560 nm (similar to that shown in FIG. 26), attributed to the dipolar localized surface plasmon resonance of Cu nanoparticles for all samples, with only a slight broadening due to the damping effect of Ru adatoms on the Cu nanoparticle plasmon.

Figure 35:
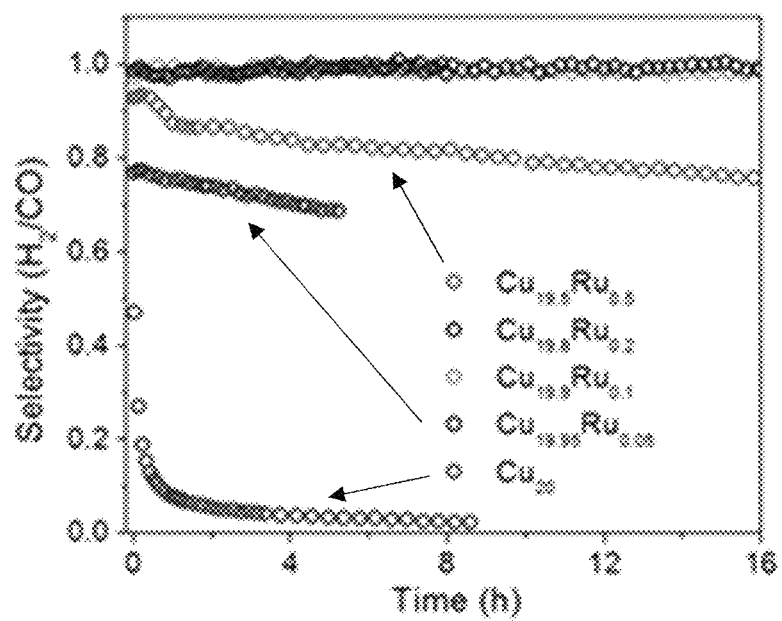
FIG. 35 shows the selectivity and long-term stability during photocatalytic dry methane reforming reaction under 19 W/cm² white light illumination.

FIG. 34 shows the reaction rate and long-term stability during photocatalytic dry methane reforming reaction under 19 W/cm² white light illumination. The arrow in FIG. 34 indicates the relative ordering for the listed catalysts by $CH_4$ reaction rate. FIG. 35 shows the selectivity and long-term stability during photocatalytic dry methane reforming reaction under 19 W/cm² white light illumination. The arrows in FIG. 35 point the label to the respective plot. The plots for the $Cu_{19.8}Ru_{0.2}$ and the $Cu_{19.9}Ru_{0.1}$ samples overlap at the uppermost selectivity. During the experiments the reactor temperature was kept at room temperature and selectivity is defined as the ratio of formation rate of $H_2$ to CO.

For pure copper nanoparticles ($Cu_{20}$), an initial reaction rate of ~50 µmol $CH_4$/g/s under 19 W/cm² white light illumination was detected. But the activity quickly decayed to only ~4 µmol/g/s after 5 h reaction. Coke deposition on the surface of nanoparticles strongly correlated with photocatalyst deactivation. A black substance formed on the surface of the photocatalyst pellet soon after light excitation, which was identified as amorphous carbon by Raman spectroscopy. Though the surface temperature at the hottest spot of catalyst pellet due to light-induced heating was measured to be ~750° C. under current experimental conditions, Ostwald ripening of the nanoparticles is not significant, since the size distribution of the nanoparticles after photocatalysis were measured to barely change.

Notably, an extremely low fraction of Ru ($Cu_{19.95}Ru_{0.05}$) was observed to increase the initial photocatalytic reaction rate by ~2.5 times (128 µmol/g/s), greatly improving the stability, with ~90% activity maintained after a continuous 5 hour experiment. Furthermore, an unprecedented stability was achieved for both $Cu_{19.9}Ru_{0.1}$ and $Cu_{19.8}Ru_{0.2}$ catalysts, with 100% efficiency maintained over a 20-hour photocatalytic reaction. Even after 50 hours, no decay was observed at all for the $Cu_{19.9}Ru_{0.1}$ sample. There is no appearance of carbonaceous species in the Raman spectra of the spent catalysts and the increase of carbon content was negligible from Element Analysis. Ru sites are more reactive for methane dissociation than the pure copper surface, as predicted by DFT calculations, where the atomic dispersion of reactive sites suppresses C—C bond formation and concomitant coking by isolating the surface carbon intermediates. For the $Cu_{19.95}Ru_{0.05}$ sample, the surface coverage of Ru was too low and a substantial part of the reaction was catalyzed by the exposed copper surface, which is vulnerable to coking. Further increase of Ru loading ($Cu_{19.5}Ru_{0.5}$) gave a higher initial photocatalytic reaction rate as expected, but the stability was compromised, with 13% of photocatalytic activity lost after a 16 hour reaction. This is likely due to increased Ru concentration, because the Ru atoms start to form surface islands at this coverage, where the carbon intermediates can polymerize to form coke.

Figure 36:
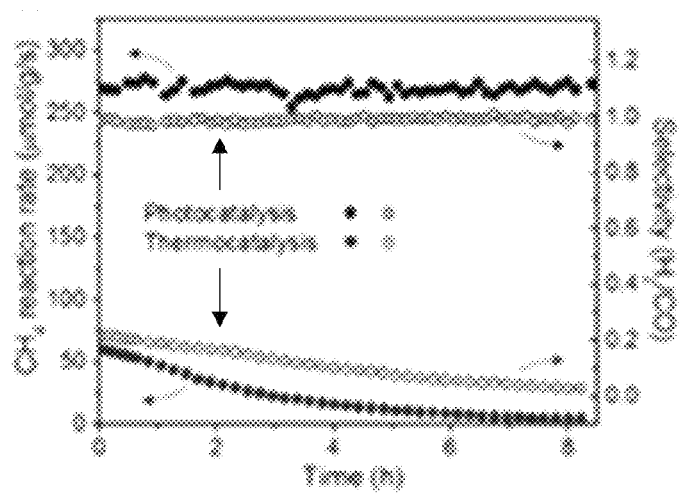
FIG. 36 shows the long-term stability (solid circles) and selectivity (open circles) of photocatalysis under 19 W/cm² white light illumination and thermocatalysis at 1000 K reactor temperature when using the $Cu_{19.8}Ru_{0.2}$ catalyst.

FIG. 36 shows the long-term stability (solid circles) and selectivity (open circles) of photocatalysis under 19 W/cm² white light illumination and thermocatalysis at 1000 K reactor temperature when using the $Cu_{19.8}Ru_{0.2}$ catalyst. The initial reaction rate of thermocatalysis of $Cu_{19.8}Ru_{0.2}$ at 727° C. in the dark was only ~60 µmol $CH_4$/g/s, which is less than 25% of the photocatalytic reaction rate with 19 W/cm² white light illumination and no applied heating (~275 µmol $CH_4$/g/s). Considering the comparable surface temperature at the hottest spot (~750° C.) and the gradient distribution of temperature in the volume heated by light illumination, we propose that hot-carrier-mediated chemical reaction is the major mechanism in this photocatalysis process. The thermocatalytic reaction rate observed was less stable than the photocatalytic reaction rate, decaying to ~4 µmol $CH_4$/g/s after 8 h. From TEM, Raman spectroscopy and Elemental Analysis, it was concluded that coke deposition, rather than sintering, is likely the cause of the instability in the thermocatalysis, despite the single-atom-alloy surface, revealing that hot carriers are important for coke resistance. The low selectivity of the thermocatalyzed reaction indicates that surface-adsorbed H is inclined to react with $CO_2$ to decrease the surface abundance of oxygen intermediates, which suppresses the removal of adsorbed carbon from the surface through oxidative gasification ($C(a)+O(a) \rightarrow CO(g)$). In other words, the kinetic mismatch between the formation and gasification rates of surface carbon results in accumulated coke deposition.

On the other hand, in photocatalysis, hot carriers may enhance the associative desorption of $H_2$, as reflected by the high observed selectivity, and consequently maintain the surface abundance of oxygen intermediates for surface carbon removal. Additionally, hot carriers could probably enhance the direct reaction between $CO_2$ and absorbed C on Ru sites through the reverse Boudouard reaction ($C+CO_2 \rightarrow 2CO$), which has a relatively high reaction barrier in the ground state and is hardly feasible through phonon excitation.

Figure 37:
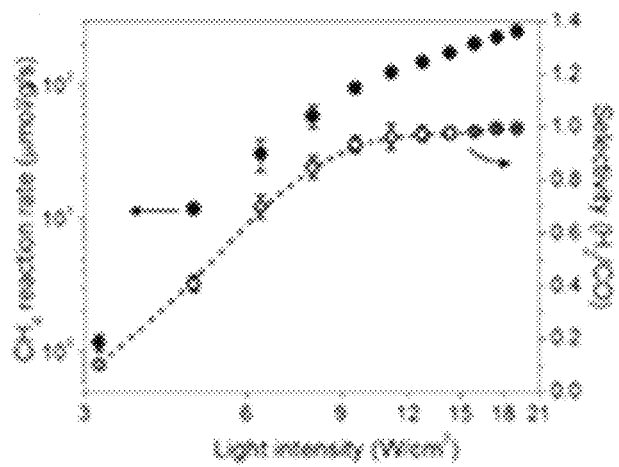
FIG. 37 shows a plot of the intensity dependence of the photocatalytic reaction rate and selectivity using the $Cu_{19.8}Ru_{0.2}$ catalyst.
Figure 38:
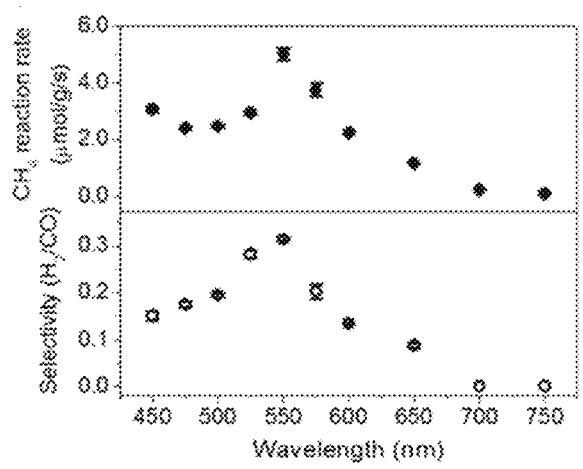
FIG. 38 shows a plot of the wavelength dependence of the photocatalytic reaction rate and selectivity using the $Cu_{19.8}Ru_{0.2}$ catalyst.

FIG. 37 shows a plot of the intensity dependence of the photocatalytic reaction rate and selectivity using the $Cu_{19.8}Ru_{0.2}$ catalyst. Error bars represent the standard deviation of measurements of three different batches of sample. FIG. 38 shows a plot of the wavelength dependence of the photocatalytic reaction rate and selectivity using the $Cu_{19.8}Ru_{0.2}$ catalyst. Light intensity of 3.5 W/cm² was used for all wavelengths. Error bars represent the standard deviation of measurements by the gas chromatograph at the same spot of the same batch of sample. For all the photocatalytic experiments shown in FIGS. 34-38, 1.5 mg catalyst was used and 2 mm light spot was shined onto the surface of sample pellet. The reactor temperature was kept at room temperature. For the thermocatalytic experiments in FIG. 36, 5-10 mg catalyst was used and the experiments were performed in the dark.

The apparent activation barrier ($E_{app}$) for methane dry reforming on the $Cu_{19.8}Ru_{0.2}$ photocatalyst was measured to be 0.85 eV from Arrhenius fitting of thermocatalytic reaction rates at different temperatures. The selectivity shows a V-shaped dependence on temperature, with a transition temperature at ~800 K (527° C.). Initially, the selectivity decreases from a maximum value of about 0.3 $H_2$/CO with increasing temperature in the temperature region of 650-800 K, probably because the reaction rate of the RWGS side reaction rises up faster with temperature compared to that of the methane dry reforming reaction. However, the Gibbs free energy of the RWGS side reaction becomes less negative and constrains its reaction rate at higher temperature (T>800 K). The theoretical lower limit of the selectivity predicted by thermodynamics reproduces the experimental values in the thermodynamics-controlled region (T>800 K) quite well. On the contrary, the selectivity of photocatalysis (FIG. 37) increases monotonically with light intensity, reaching ~100% for intensity above ~10 W/$cm^2$. The dramatic contrast of the absolute values and the trend in selectivity between thermocatalysis and photocatalysis confirms the dominant role of a hot-carrier-mediated mechanism in the photocatalysis process.

The wavelength dependence plots shown in FIG. 38 shows that the highest reaction rate and selectivity were observed when the sample was illuminated by light of 550 nm wavelength, the plasmonic resonant wavelength of the nanoparticles. For wavelengths longer than 550 nm, both of the reaction rate and the selectivity decreased because fewer hot carriers can be generated. For shorter wavelength ($\lambda$550 nm), though the absorption remained high, the reaction rate and selectivity also decreased. The portion of absorption attributed to the interband transition of Cu is substantial in this wavelength region, increasing as the wavelength decreases while the hot carriers produced from interband transitions are less energetic compared to the surface plasmon-derived hot carriers. The reactivity increases again at 450 nm, which we attribute to the synergistic effect of photothermal heating and surface plasmon-derived hot carriers. Although the number of effective hot carriers from plasmon decay decreases in the wavelength region of 475 nm-450 nm, the surface temperature is increased due to higher overall absorption: this could significantly enhance hot-carrier activation and subsequent chemical reactivity at these wavelengths. However, this effect is less substantial for associative desorption of $H_2$, since the selectivity decreases monotonically with shorter wavelength, probably because temperature has only a minor effect on the kinetics of an elementary step with a small activation barrier. The wavelength dependence suggests that hot carriers derived from surface plasmon decay are mainly responsible for the hot-carrier-mediated mechanism and the effect of temperature is more apparent when surface plasmon-derived hot carriers are rare, for example at the interband transition region.

The direct coupling of plasmonic materials with reactive particles into a single multicomponent plasmonic complex allows for absorption enhancements in and/or hot carrier transfer to poorly light-absorbing reactive components. With multicomponent plasmonic photocatalysts as described herein, hot-carrier production and photothermal heating can be dramatically increased near catalytically active surfaces. This concept is a highly modular one; for example, tuning the composition or size of the plasmonic material allows for light-induced photocatalysis at specific wavelengths of the electromagnetic spectrum, enabling optimization of such multicomponent plasmonic complexes for specific chemical reactions and reaction pathways. Likewise, by changing the reactive component to different metals, alloys, semiconductors, or insulators, the surface chemistry and photocatalytic activity can be highly tuned. Multicomponent plasmonic photocatalsysts may increase hot-carrier production, thereby allowing for new, light-driven reaction pathways on a reactive component attached thereto. Developing the multicomponent plasmonic concept to favor specific hot carrier-driven photocatalytic processes where control over reaction specificities is highly desirable and opens a new door for the development of precise, ultimately predictive control of catalytic chemistry using light.

Advantageously, the multicomponent plasmonic photocatalysts of the present disclosure alleviates the issue that plasmonic materials have relatively inert surfaces for most chemical reactions and for substrate binding by combining the plasmonic materials with another catalytic particle or particles or atoms having more reactive surfaces or sites resulting in increased reactivity and selectivity compared to traditional single component catalysts and sensors. The direct coupling of plasmonic materials with reactive particles into a single multicomponent plasmonic complex allows for absorption enhancements in poorly light-absorbing reactive components. With multicomponent plasmonic photocatalysts as described herein, hot-carrier production and photothermal heating can be dramatically increased near catalytically active surfaces. This concept is a highly modular one; for example, tuning the composition or size of the plasmonic material allows for light-induced photocatalysis at specific wavelengths of the electromagnetic spectrum, enabling optimization of such multicomponent plasmonic complexes for specific chemical reactions and reaction pathways. Likewise, by changing the reactive component to different metals, alloys, semiconductors, or insulators, the surface chemistry and photocatalytic activity can be highly tuned. Multicomponent plasmonic photocatalsysts may increase hot-carrier production, thereby allowing for new, light-driven reaction pathways on a reactive component attached thereto. Developing the multicomponent plasmonic concept to favor specific hotcarrier-driven photocatalytic processes where control over reaction specificities is highly desirable and opens a new door for the development of precise, ultimately predictive control of catalytic chemistry using light. A transition from extreme, high-temperature conditions to low-temperature activation of catalytically active transition metal nanoparticles could have widespread impact, substantially reducing the current energy demands of heterogeneous catalysis.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:
1. A multicomponent photocatalyst comprising:
a reactive component optically, electronically, or thermally coupled to a plasmonic material, wherein the plasmonic material has at least a portion of its surface coated with a spacer material that separates the reactive component and the plasmonic material.

2. The multicomponent photocatalyst of claim 1, wherein the plasmonic material is selected from gold (Au), silver (Ag), copper (Cu), aluminum (Al), alloys thereof, TiN, or doped semiconductors.

3. The multicomponent photocatalyst of claim 1, wherein the plasmonic material is a 2-dimensional material.

4. The multicomponent photocatalyst of claim 1, wherein the spacer material is selected from a carbonaceous material, a nitride, a phosphide, a silicide, an arsenide, a selenide, a telluride, a hydride, a sulfide, a carbide, metal organic frameworks, covalent organic frameworks, a polymeric material, or an oxide.

5. The multicomponent photocatalyst of claim 1, wherein the plasmonic material has a plasmon resonance at a wavelength between 180 nm and 10 microns.

6. The multicomponent photocatalyst of claim 1, wherein the plasmonic material has a plasmon resonance at a wavelength between about 380 nm 760 nm of the electromagnetic spectrum.

7. The multicomponent photocatalyst of claim 1, wherein the plasmonic material has at least one dimension with a size between about 1 nm and 300 nm.

8. The multicomponent photocatalyst of claim 1, wherein the reactive component is a metal, semiconductor, insulator, single atom species, ionic species, organic molecules, metal complexes, or atomic cluster species.

9. The multicomponent photocatalyst of claim 1, wherein the reactive component is a transition metal or a transition metal oxide.

10. The multicomponent photocatalyst of claim 1, wherein the reactive component has at least one dimension with a size between an atomic diameter of a metal or ion and 100 nm.

11. The multicomponent photocatalyst of claim 1, wherein the reactive component is physically/chemically attached to the spacer material that separates the reactive component and the plasmonic component by a distance of up to 30 nm.

12. A method of performing a catalytic reaction, comprising:
  loading a multicomponent photocatalyst comprising a reactive component optically coupled to a plasmonic material into a reaction chamber, wherein the plasmonic material has at least a portion of its surface coated with a spacer material that separates the reactive component and the plasmonic material;
  introducing molecular reactants into the reaction chamber; and
  illuminating the reaction chamber with a light source having a wavelength overlapping a plasmon resonance of the plasmonic material.

13. The method of claim 12, wherein a reaction medium in the reaction chamber is externally heated or externally cooled during the catalytic reaction.

14. The method of claim 12, wherein the multicomponent photocatalyst is only heated by photothermal heating induced by the illuminating.

15. The method of claim 12, wherein the plasmonic material is selected from gold (Au), silver (Ag), copper (Cu), aluminum (Al), alloys thereof, TiN, or doped semiconductors.

16. The method of claim 12, wherein the plasmonic material has a plasmon resonance at a wavelength between 180 nm and 10 microns.

17. The method of claim 12, wherein the reactive component is a metal, semiconductor, insulator, single atom species, ionic species, or atomic cluster species.

18. The method of claim 12, wherein the multicomponent photocatalyst is dispersed onto a support material prior to loading in the reaction chamber.

* * * * *